(12) United States Patent
Valenzuela et al.

(10) Patent No.: US 11,170,495 B2
(45) Date of Patent: Nov. 9, 2021

(54) SCANNING APPARATUS AND METHOD OF SCANNING

(71) Applicant: The Boeing Company, Chicago, IL (US)

(72) Inventors: Dario I. Valenzuela, Mukilteo, WA (US); Eric M. Reid, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/658,751

(22) Filed: Oct. 21, 2019

(65) Prior Publication Data

US 2021/0118126 A1 Apr. 22, 2021

(51) Int. Cl.
*H04N 7/18* (2006.01)
*G06T 7/00* (2017.01)
(Continued)

(52) U.S. Cl.
CPC ............ *G06T 7/0008* (2013.01); *G01B 11/14* (2013.01); *G06T 7/97* (2017.01); *H04N 5/2253* (2013.01);
(Continued)

(58) Field of Classification Search
CPC ......... G01N 2291/2694; G01N 29/265; G01N 2291/0231; G01N 29/043; G01N 29/225; G01N 2291/0258; G01N 2291/0289; G01N 2291/2634; G01N 29/0654; G01N 29/44; G01N 25/72; G01N 17/006;
(Continued)

(56) References Cited

U.S. PATENT DOCUMENTS 6,378,387 B1 4/2002 Froom
2003/0167849 A1* 9/2003 Yamamoto ........... G01N 29/343
73/620

(Continued)

FOREIGN PATENT DOCUMENTS

WO WO 2016/179448 11/2016

OTHER PUBLICATIONS

Manohar et al.: "Predicting shim gaps in aircraft assembly with machine learning and sparse sensing," Department of Applied Mathematics, University of Washington; The Boeing Company; Department of Industrial and Systems Engineering, University of Washington; Department of Mechanical Engineering, University of Washington (Nov. 27, 2017).
European Patent Office, Extended European Search Report, App. No. 20193918.8 (dated Mar. 12, 2021).

*Primary Examiner* — Masum Billah
(74) *Attorney, Agent, or Firm* — Walters & Wasylyna LLC

(57) ABSTRACT

A scanning apparatus for predictive shimming includes a scanning platform. The scanning apparatus also include a first scanner, coupled to the scanning platform, and a second scanner, coupled to the scanning platform. The scanning platform is configured to move the first scanner and the second scanner together along an X-axis and a Z-axis. The scanning platform is also configured to move the first scanner and the second scanner independent of and relative to each other along a Y-axis and a Z-axis. A first field of view of the first scanner and a second field of view of the second scanner at least partially overlap when the first scanner and the second scanner move in opposite directions along the Y-axis.

21 Claims, 20 Drawing Sheets

(51) Int. Cl.
    *H04N 5/232*     (2006.01)
    *G01B 11/14*     (2006.01)
    *H04N 5/225*     (2006.01)
    *H04N 5/247*     (2006.01)

(52) U.S. Cl.
    CPC ......... *H04N 5/23299* (2018.08); *H04N 5/247* (2013.01); *G06T 2207/30108* (2013.01)

(58) Field of Classification Search
    CPC .... G01N 2291/26; G01N 22/00; G01N 22/02; G01N 1/312; G01N 1/44; G01N 2035/00039; G01N 2035/00138; G01N 2035/00168
    USPC .......................................................... 348/94
    See application file for complete search history.

(56) References Cited

U.S. PATENT DOCUMENTS

| | | | |
|---|---|---|---|
| 2015/0247947 A1* | 9/2015 | Bendahan | G01N 23/04 378/57 |
| 2015/0294032 A1 | 10/2015 | Lagally et al. | |
| 2015/0319323 A1* | 11/2015 | Xu | H04N 1/00567 358/498 |
| 2017/0176342 A1* | 6/2017 | Colletti | G01M 15/14 |
| 2017/0327201 A1 | 11/2017 | Doyle et al. | |
| 2018/0128751 A1* | 5/2018 | Ingram | G01N 21/8851 |
| 2018/0208328 A1 | 7/2018 | Charlton et al. | |
| 2018/0318926 A1* | 11/2018 | Woods | B23K 26/0648 |
| 2019/0122425 A1 | 4/2019 | Sheffield | |
| 2019/0265021 A1* | 8/2019 | Valenzuela | G01B 11/24 |

* cited by examiner

SCANNING APPARATUS AND METHOD OF SCANNING

FIELD

The present disclosure relates generally to manufacturing and, more particularly, to a scanning apparatus and method of scanning used for predictive shimming of gaps.

BACKGROUND

Modern aircraft may require custom shims to fill gaps between structural components in the airframe that arise due to manufacturing tolerances. The shims are used to eliminate gaps, maintain structural performance, and minimize pull-down forces. The number of shims may rapidly add up across a large structure. Currently, the gap filling process involves manual inspection to gather measurement data used for shim fabrication. In either case, the process may amount to a significant increase in manufacturing cycle time and cost. Additionally, gathering the measurement data may be cumbersome due to the size of the component being inspected.

SUMMARY

Accordingly, apparatuses and methods, intended to address at least the above-identified concerns, would find utility. The following is a non-exhaustive list of examples, which may or may not be claimed, of the subject matter according to the present disclosure.

In an example, a disclosed scanning apparatus includes a scanning platform. The scanning apparatus also include a first scanner, coupled to the scanning platform, and a second scanner, coupled to the scanning platform. The scanning platform is configured to move the first scanner and the second scanner together along an X-axis and a Z-axis. The scanning platform is also configured to move the first scanner and the second scanner independent of and relative to each other along a Y-axis and a Z-axis.

In an example, a disclosed method of scanning includes steps of: (1) moving a scanning platform to a scan location relative to the part; (2) at the scan location, moving a first scanner and a second scanner along an X-axis relative the part; (3) with the first scanner at a first X-location, moving the first scanner along a Y-axis relative to the part; (4) with the second scanner at a second X-location, moving the second scanner along the Y-axis relative to the part; (5) while moving the first scanner, scanning a first portion of the part to form first scan-data; and (6) while moving the second scanner, scanning a second portion of the part to form second scan-data. The first portion of the part, scanned by the first scanner, and the second portion of the part, scanned by the second scanner, partially overlap each other. A first subset of the first scan-data and a second subset of the second scan-data represent an overlap of the first portion and the second portion.

Other examples of the disclosed apparatus, system, and method will become apparent from the following detailed description, the accompanying drawings and the appended claims.

DETAILED DESCRIPTION

Figure 1:
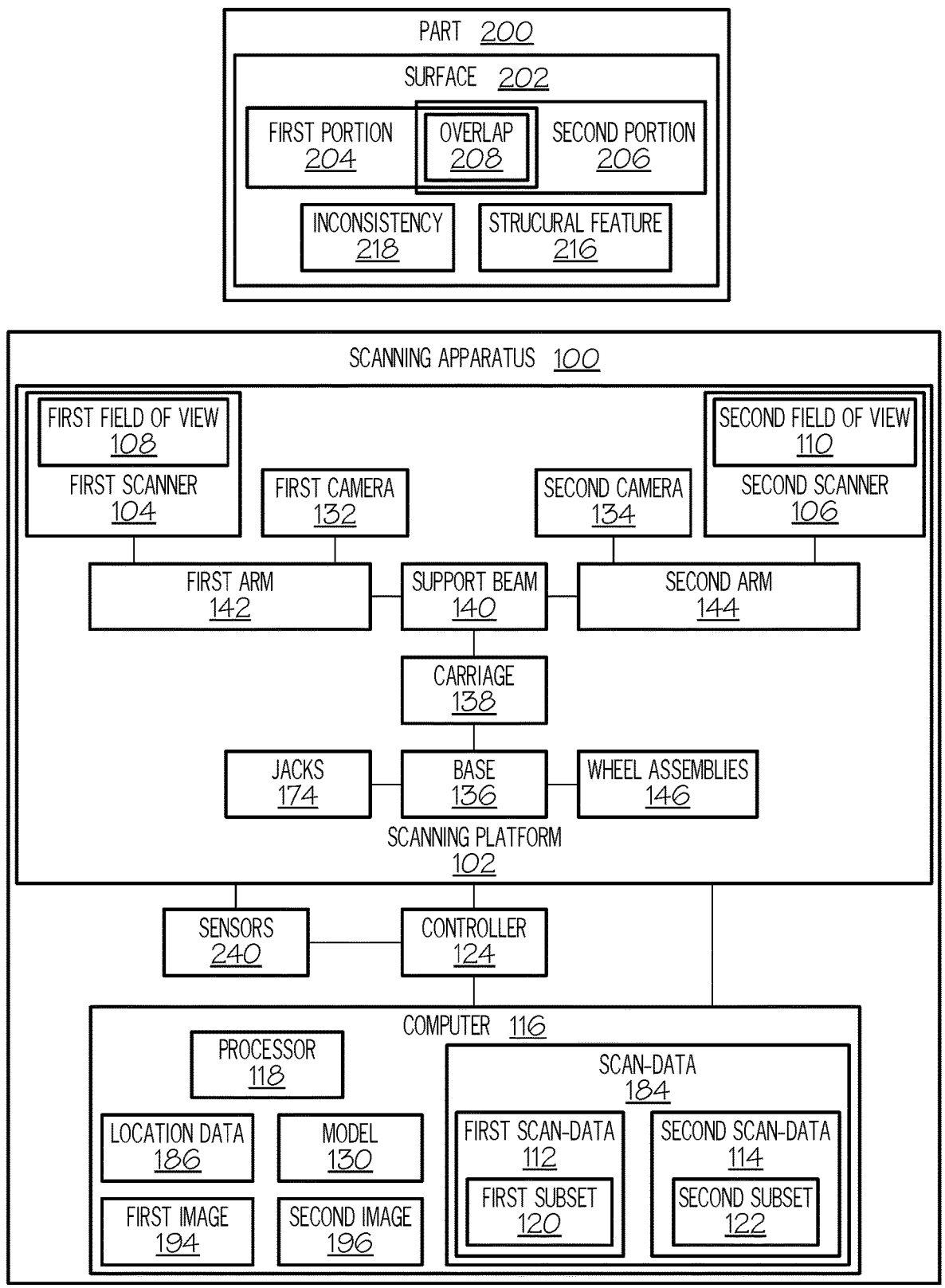
FIG. 1 is a schematic block diagram of an example of a scanning apparatus.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

The present disclosure recognizes that during assembly of an aircraft, gaps may be formed between mating surfaces of parts of an airframe due to manufacturing tolerances. Shims may be fabricated and placed within gaps that have dimensions outside of a predetermined tolerance. However, the geometry of the gaps and corresponding shims may vary across the part, and thus each shim location may need to be inspected and each gap may need to be measured prior to fabrication of the shim. Accordingly, it is desirable to quickly and accurately identify shim gaps and fabricate shims.

The present disclosure recognizes that an inspection tool is typically brought into a manufacturing area to inspect parts. Set-up and operation of the inspection tool add time and cost to the manufacturing cycle. Inspection of the shim locations and fabrication of the shims require accurate measurements, which further add to the time and cost of the manufacturing cycle. Accordingly, it is desirable to reduce the time and cost associated with inspecting the part and fabricating the shims.

The present disclosure recognizes that prediction of gaps that need to be filled may enable shims to be fabricated prior to assembly of the aircraft parts. Prediction of gaps and corresponding shims may reduce at least one of manufacturing time and cost and may result in a more automated process. However, predictive shimming requires a high degree of scanning accuracy. Accordingly, it is desirable to obtain highly accurate and dense scan data of one or both mating parts.

The present disclosure recognizes that obtaining desirably accurate scan data may become challenging for very large parts or for parts having varying geometries. For example, conventional inspection tools may be limited in their reach. To inspect large parts, the inspection tool may need to be moved to different locations relative to the part or additional inspection tools may be needed to completely scan the part. Each additional set-up may add manufacturing cycle time to the part. Additionally, multiple set-ups may result in inconsistent scan data. Accordingly, it is desirable to quickly and accurately obtain scan data for a large part.

The present disclosure recognizes that the accuracy of scan data obtained by a conventional inspection tool, such as a laser scanner, reduces as the distance of location being scanned increases from the inspection tool. Accordingly, it is desirable to maintain an optimal and consistent distance between the scanned location and the inspection tool.

Referring to FIG. 1, by way of examples, the present disclosure describes a scanning apparatus 100 for predictive shimming. For example, the scanning apparatus 100 is used to scan at least a portion of a part 200 for a predictive shimming operation. The part 200 is any one of various types of objects that is subject to a scanning operation performed in preparation for one or more subsequent manufacturing operations. The scanning apparatus 100 provides a means for scanning at least a portion of the part 200 and collecting scan data 184 representing the part 200.

Figure 3:
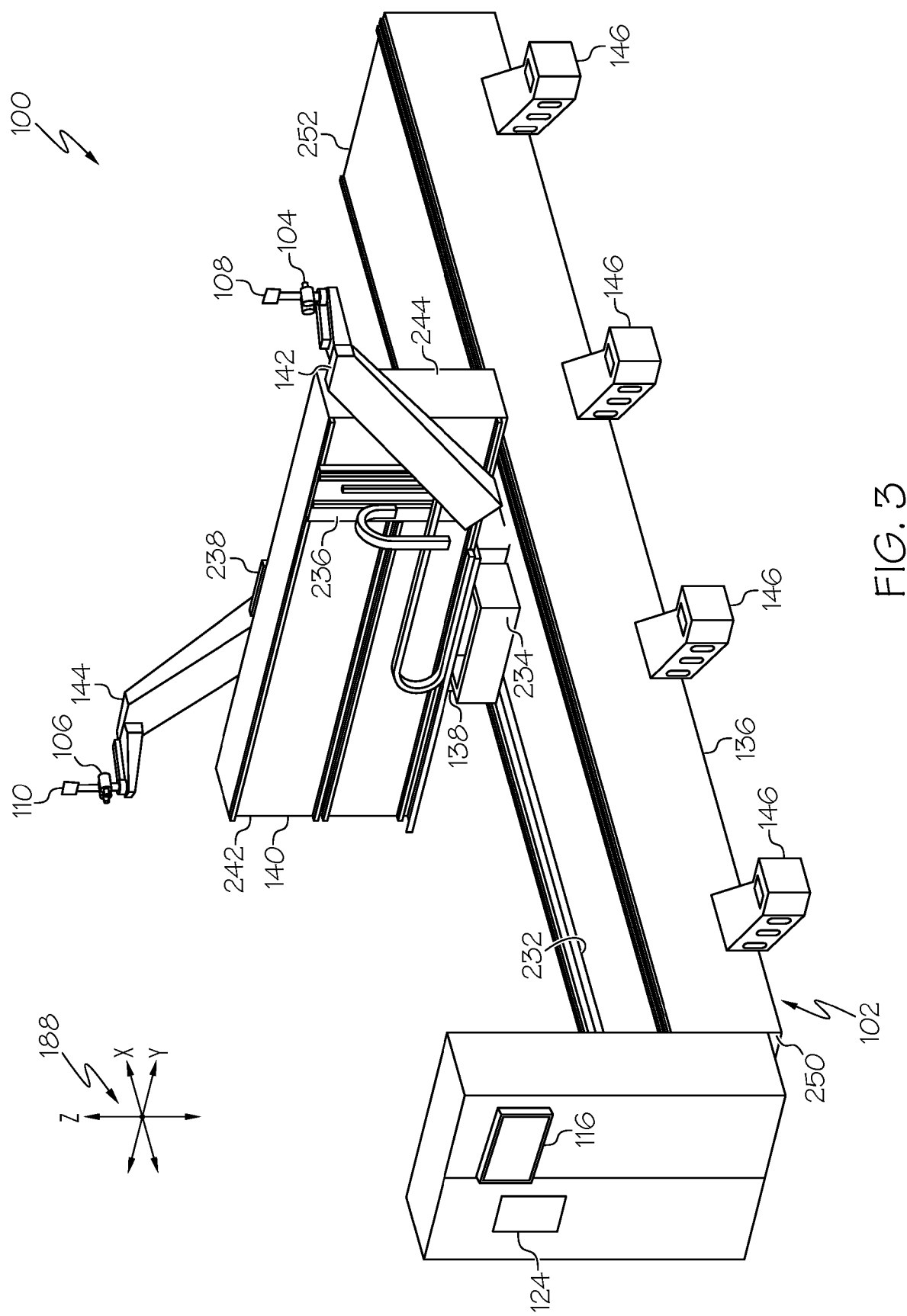
FIG. 3 is a schematic, perspective view of an example of the scanning apparatus of FIG. 1.

The scan data 184 is a digital representation of at least a portion of the part 200 and is used to predict shim gaps between the part 200 and a second part (FIG. 3). For example, the scan data 184 includes, or takes the form of, measurement data that represents at least a portion of a geometry of the part 200, such as the geometry of at least a portion of a surface 202 of the part 200.

In an example, the scan data 184 is used to generate a model 130 of the part 200. The model 130 is a virtual (e.g., digital) representation of the actual geometry of the surface 202 of the part 200. In one example, the model 130 (e.g., the actual geometry) of the part 200 is compared to a design (e.g., the theoretical geometry) of the part 200 and shims 222 (FIG. 5) are fabricated based on the differences between the part 200 and the design. In another example, the model 130 of the part 200 is compared to a second model (e.g., the actual geometry) of the second part 220 (FIG. 5) and the shims 222 are fabricated based on the differences between the part 200 and the second part 220.

Figure 2:
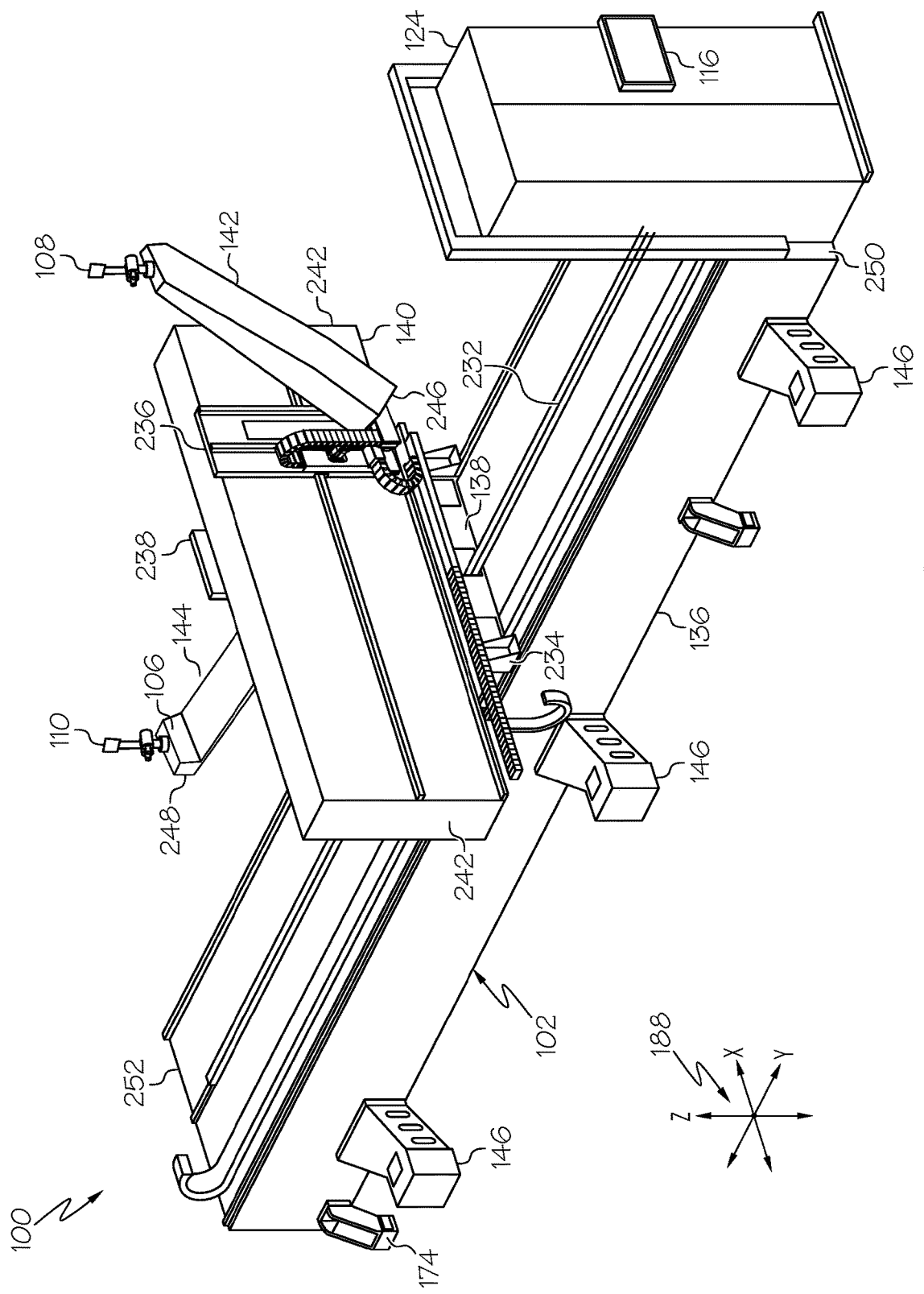
FIG. 2 is a schematic, perspective view of an example of the scanning apparatus of FIG. 1.

Referring generally to FIG. 1 and particularly to FIGS. 2 and 3, the scanning apparatus 100 includes a scanning platform 102, a first scanner 104 to form first scan-data 112 for predictive shimming, and a second scanner 106 to form second scan-data 114 for predictive shimming. The first scanner 104 is coupled to the scanning platform 102. The second scanner 106 is coupled to the scanning platform 102. The scanning platform 102 is configured to move the first scanner 104 and the second scanner 106 together along an X-axis. The scanning platform 102 is also configured to move the first scanner 104 and the second scanner 106 together and/or independent of each other along a Z-axis. The scanning platform 102 is further configured to move the first scanner 104 and the second scanner 106 independent of each other and relative to each other along a Y-axis.

Throughout the present disclosure, a relative location of an item and/or a direction of movement of an item refer to the spatial situation of the item in three-dimensional space, such as relative to a fixed coordinate system 188 (FIGS. 2 and 3). In an example, the fixed coordinate system 188 is a Cartesian coordinate system defined by three orthogonal axes, such as an X-axis, a Y-axis, and a Z-axis. In an example, the orientation of the coordinate system 188 is fixed relative to the scanning apparatus 100. In another example, the orientation of the coordinate system 188 is fixed relative to a manufacturing environment in which the scanning apparatus 100 operates.

The scanning platform 102 is configured to be moved to a scan location relative to the part 200 at initiation of a scanning operation. In an example, the scanning platform 102 is configured to be moved along at least one of the X-axis, the Y-axis, and the Z-axis. While at the scan location, the scanning platform 102 moves the first scanner 104 and the second scanner 106 relative to the part 200 and relative to each other during the scanning operation.

In an example, the first scanner 104 moves along a first scan path (e.g., parallel to the Y-axis) relative to the part 200 to form (e.g., acquire or generate) a first portion of the scan data 184, representing a first portion 204 of the part 200. In an example, the first portion 204 of the part 200 is a first portion of the surface 202 of the part 200. Accordingly, throughout the present disclosure, the term "first portion 204" refers, generally, to a portion of the part 200 and, particularly, to a portion of the surface 202 of the part 200.

In an example, the second scanner 106 moves along a second scan path (e.g., parallel to the Y-axis) relative to the part 200 to form (e.g., acquire or generate) a second portion of the scan data 184, representing a second portion 206 of the part 200. In an example, the second portion 206 of the part 200 is a second portion of the surface 202 of the part 200. Accordingly, throughout the present disclosure, the term "second portion 206" refers, generally, to a portion of the part 200 and, particularly, to a portion of the surface 202 of the part 200.

In an example, when moving the first scanner 104 along the first scan path, the scanning platform 102 is configured to move the first scanner 104 along the Y-axis (e.g., the first scan path has a component in the Y-direction). In an example, when moving the first scanner 104 along the first scan path, the scanning platform 102 is also configured to move the first scanner 104 along the Z-axis (e.g., the first scan path has a component in the Z-direction).

In an example, when moving the second scanner 106 along the second scan path, the scanning platform 102 is configured to move the second scanner 106 along the Y-axis (e.g., the second scan path has a component in the Y-direction). In an example, when moving the second scanner 106 along the second scan path, the scanning platform 102 is also configured to move the second scanner 106 along the Z-axis (e.g., the second scan path has a component in the Z-direction).

Referring to FIGS. 2 and 3, in an example, the scanning platform 102 includes a base 136 and a carriage 138. The carriage 138 is coupled to the base 136 and is movable relative to the base 136 along the X-axis. The scanning platform 102 also includes a support beam 140. The support beam 140 is coupled to the carriage 138 and is movable relative to the carriage 138 along the Z-axis. The scanning platform 102 further includes a first arm 142 and a second arm 144. The first arm 142 is coupled to the support beam 140 and is movable relative to the support beam 140 along the Y-axis and the Z-axis. The second arm 144 is coupled to the support beam 140 and is movable relative to the support beam 140 along the Y-axis and the Z-axis. The first arm 142 and the second arm 144 extend in opposite directions along the Y-axis. The first scanner 104 is coupled to the first arm 142. The second scanner 106 is coupled to the second arm 144.

In an example, the base 136 includes a support frame and provides, or serves as, a support structure for the carriage 138. The base 136 is configured to be moved to the scan location relative to the part 200 at initiation of the scanning operation. In an example, the base 136 is configured to be moved along at least one of the X-axis, the Y-axis, and the Z-axis.

The carriage 138 is configured to be moved relative to the part 200 and relative to the base 136, such as along the X-axis. Movement of the carriage 138 along the X-axis relative to the base 136, in turn, moves the first scanner 104 and the second scanner 106 to respective locations along the X-axis relative to the part 200.

In an example, the scanning platform 102 includes a carriage-drive mechanism 232. The carriage-drive mechanism 232 is operatively coupled to the base 136 and the carriage 138. The carriage-drive mechanism 232 is configured to move the carriage 138 relative to the base 136, such as along the X-axis.

The carriage-drive mechanism 232 includes any suitable drive assembly configured to accurately and repeatably move the carriage 138 relative to the base 136. In an example, the carriage-drive mechanism 232 includes a drive component. The drive component is configured to generate a driving force sufficient to move the carriage 138. The carriage-drive mechanism 232 also includes a transmission component. The transmission component is configured to transfer the driving force from the drive component to the carriage 138.

In an example, the carriage-drive mechanism 232 is a linear drive assembly, such as a mechanical drive assembly, a pneumatic drive assembly, or a hydraulic drive assembly. For example, the carriage-drive mechanism 232 includes a motor (the drive component) and a gear assembly (the transmission component). In an example, the carriage-drive mechanism 232 also includes a brake and a travel limiter.

In an example, the carriage 138 includes a support frame and provides, or serves as, a support structure for the support beam 140. The support beam 140 is configured to be moved relative to the part 200 and relative to the carriage 138, such as along the Y-axis.

Movement of the support beam 140 along the Y-axis relative to the carriage 138, in turn, moves the first scanner 104 and the second scanner 106 to respective locations along the Y-axis relative to the part 200.

In an example, the scanning platform 102 includes a support-beam-drive mechanism 234. The support-beam-drive mechanism 234 is operatively coupled to the carriage 138 and the support beam 140. The support-beam-drive mechanism 234 is configured to move the support beam 140 relative to the carriage 138, such as along the Z-axis.

The support-beam-drive mechanism 234 includes any suitable drive assembly configured to accurately and repeatably move the support beam 140 relative to the carriage 138. In an example, the support-beam-drive mechanism 234 includes a drive component, configured to generate a driving force sufficient to move the support beam 140. The support-beam-drive mechanism 234 also includes a transmission component, configured to transfer the driving force from the drive component to the support beam 140.

In an example, the support-beam-drive mechanism 234 is a linear drive assembly, such as a mechanical drive assembly, a pneumatic drive assembly, or a hydraulic drive assembly. For example, the support-beam-drive mechanism 234 includes a servomotor (the drive component) and a ball screw assembly (the transmission component). In an example, the support-beam-drive mechanism 234 also includes a brake and a travel limiter.

In an example, the support beam 140 includes a support frame and provides, or serves as, a support structure for the first arm 142 and the second arm 144. Each one of the first arm 142 and the second arm 144 is configured to be moved relative to the part 200 and relative to the support beam 140, such as along at least one of the Y-axis and the Z-axis.

Movement of the first arm 142 along the Y-axis relative to the support beam 140, in turn, moves the first scanner 104 to a respective location along the Y-axis relative to the part 200. Movement of the first arm 142 along the Z-axis relative to the support beam 140, in turn, moves the first scanner 104 to a respective location along the Z-axis relative to the part 200.

Movement of the second arm 144 along the Y-axis relative to the support beam 140, in turn, moves the second scanner 106 to a respective location along the Y-axis relative to the part 200. Movement of the second arm 144 along the Z-axis relative to the support beam 140, in turn, moves the second scanner 106 to a respective location along the Z-axis relative to the part 200.

In an example, the scanning platform 102 includes a first arm-drive mechanism 236. The first arm-drive mechanism 236 is operatively coupled to the support beam 140 and the first arm 142. The first arm-drive mechanism 236 is configured to move the first arm 142 relative to the support beam 140, such as along at least one of the Y-axis and the Z-axis. The first arm-drive mechanism 236 includes any suitable drive assembly configured to accurately and repeatably move the first arm 142 relative to the support beam 140.

In an example, the scanning platform 102 includes a second arm-drive mechanism 238. The second arm-drive mechanism 238 is operatively coupled to the support beam 140 and the second arm 144. The second arm-drive mechanism 238 is configured to move the second arm 144 relative to the support beam 140, such as along at least one of the Y-axis and the Z-axis. The second arm-drive mechanism 238 includes any suitable drive assembly configured to accurately and repeatably move the second arm 144 relative to the support beam 140.

Each one of the first arm-drive mechanism 236 and the second arm-drive mechanism 238 includes at least one drive component, configured to generate a driving force sufficient to move a corresponding one of the first arm 142 and the second arm 144. Each one of the first arm-drive mechanism 236 and the second arm-drive mechanism 238 also includes at least one transmission component, configured to transfer the driving force from the drive component to the corresponding one of the first arm 142 and the second arm 144.

In an example, each one of the first arm-drive mechanism 236 and the second arm-drive mechanism 238 is a linear drive assembly, such as a mechanical drive assembly, a pneumatic drive assembly, or a hydraulic drive assembly. For example, each one of the first arm-drive mechanism 236 and the second arm-drive mechanism 238 includes at least one servomotor (the drive component) and at least one roller pinion assembly (the transmission component). In an example, each one of the first arm-drive mechanism 236 and the second arm-drive mechanism 238 also includes a brake and a travel limiter.

In an example, each one of the first arm-drive mechanism 236 and the second arm-drive mechanism 238 includes a pair of drive components and a pair of transmission component. Each one of the pair is configured to drive movement along one of the Y-axis and the Z-axis.

Accordingly, the scanning platform 102 is configured to provide gross motion control of the first scanner 104 and the second scanner 106 in the X-direction and the Y-direction via movement of the base 136 relative to the part 200. The scanning platform 102 is configured to provide fine motion control of the first scanner 104 and the second scanner 106 in the X-direction via movement of the carriage 138 relative to the base 136. The scanning platform 102 is configured to provide gross motion control of the first scanner 104 and the second scanner 106 in the Z-direction via movement of the support beam 140 relative to the carriage 138. The scanning platform 102 is configured to provide fine motion control of the first scanner 104 in the Y-direction and the Z-direction via movement of the first arm 142 relative to the support beam 140. The scanning platform 102 is configured to provide fine motion control of the second scanner 106 in the Y-direction and the Z-direction via movement of the second arm 144 relative to the support beam 140.

In an example, the support beam 140 is an elongate member that provides the range of motion along the Y-axis for the first arm 142 and the second arm 144. For example, each one of the first arm 142 and the second arm 144 can move between a first support-beam-end 242 of the support beam 140 and a second support-beam-end 244 of the support beam 140, opposite to the first support-beam-end 242. A maximum reach of the first scanner 104 is achieved when the first arm 142 is moved to either one of the first support-beam-end 242 and a second support-beam-end 244. Similarly, a maximum reach of the second scanner 106 is achieved when the second arm 144 is moved to either one of the first support-beam-end 242 and a second support-beam-end 244.

The first arm 142 extending along the Y-axis increases the maximum reach of the first scanner 104. For example, when the first arm 142 is moved to the second support-beam-end 244, the first arm 142 extends beyond the second support-beam-end 244 and, thus, locates the first scanner 104 at a Y-location that is beyond the second support-beam-end 244. Similarly, when the second arm 144 is moved to the first support-beam-end 244, the second arm 144 extends beyond the first support-beam-end 242 and, thus, locates the second scanner 106 at a Y-location that is beyond the first support-beam-end 242. In this example, movement of the first arm 142 and the second arm 144 to opposing ends of the support beam 140 enables the first scanner 104 and the second scanner 106 to be located proximate to edges of the part 200 at a maximum width and a minimum width of the part 200 so that an entire width W (FIG. 6) of the part 200 can be scanned along a length L (FIG. 6) of the part 200.

The first arm 142 and the second arm 144 extending in opposite directions along the Y-axis increases a maximum scanning width and decreases the minimum scanning width of the scanning apparatus 100. For example, when the first arm 142 is moved to the second support-beam-end 244 and the second arm 144 is moved to the first support-beam-end 242, the first scanner 104 and the second scanner 106 are located a maximum distance from each other. This configuration represents the maximum scanning width of the scanning apparatus 100 and accommodates the maximum width of the part 200. Conversely, when the first arm 142 is moved to the first support-beam-end 242 and the second arm 144 is moved to the second support-beam-end 244, the first scanner 104 and the second scanner 106 are located a minimum distance from each other. This configuration represents the minimum scanning width of the scanning apparatus 100 and accommodates the minimum width of the part 200.

In one or more example, the scanning platform 102 includes one or more additional degrees of freedom. In an example, the first arm 142 and the second arm 144 are configured to rotate relative to the support beam 140 (e.g., about an axis parallel to the X-axis). In another example, the support beam 140 is configured to rotate relative to the carriage 138 (e.g., about an axis parallel to the Z-axis). Additional degrees or freedom and/or relative motion between structural components of the scanning platform 102 are also contemplated.

In an example, the scanning apparatus 100 also includes at least one sensor 240 (FIG. 1). The sensor 240 is configured to detect the location of or measure the relative movement of at least one of the carriage 138, the support beam 140, the first arm 142, and the second arm 144. In an example, the scanning apparatus 100 includes a plurality of sensors 240. Each one of the sensors 240 detects the location of a corresponding one of the carriage 138, the support beam 140, the first arm 142, and the second arm 144, for example, relative to the fixed coordinate system 188.

The sensor 240 includes any suitable device or machine configured to detect a change in location of an item and send information indicative of such a change in location to a computer processor. For example, the sensor 240 includes at least one of an encoder, a machine vision system, an optical sensor, a pressure sensor, and the like.

In an example, each one of the sensors 240 is configured to form (e.g., acquire or generate) location data 186 (FIG. 1). The location data 186 is a digital representation of the spatial location of a corresponding one of the carriage 138, the support beam 140, the first arm 142, and the second arm 144, for example, relative to the fixed coordinate system 188. The location data 186 is used to determine the location of each one of the first scanner 104 and the second scanner 106, for example, relative to the fixed coordinate system 188 and, thus, relative to the part 200.

Referring still to FIGS. 2 and 3, the first scanner 104 has a first field of view 108 and the second scanner 106 has a second field of view 110. In an example, the first field of view 108 and the second field of view 110 at least partially overlap when the first arm 142 and the second arm 144 move along the Y-axis relative to the support beam 140.

For example, when the first scanner 104 moves along the first scan path and the second scanner 106 moves along the second scan path, at least a portion of the first field of view 108 and at least a portion of the second field of view 110 overlap each other. The at least partial overlap of the first field of view 108 and the second field of view 110 occurs during at least a portion of the movement of the first scanner 104 and the second scanner 106 along their respective scan paths. The at least partial overlap of the first field of view 108 and the second field of view 110 enables each one of the first scanner 104 and the second scanner 106 to generate scan data 184 that represents the same portion of the surface 202 of the part 200 during the scanning operation without changing the corresponding X-location of either one of the first scanner 104 and the second scanner 106.

In an example, each one of the first field of view 108 and the second field of view 110 is at least ninety degrees. In an example, each one of the first field of view 108 and the second field of view 110 is at least one hundred fifty degrees. In an example, each one of the first field of view 108 and the second field of view 110 is at least one hundred eighty degrees. In an example, each one of the first field of view 108 and the second field of view 110 is at one hundred ninety degrees.

In an example, each one of the first arm 142 and the second arm 144 have a first arm-end 246 and a second arm-end 248, opposite to the first arm-end 246. The first arm-end 246 of the first arm 142 is coupled to the support beam 140, for example, via the first arm-drive mechanism 236. The first scanner 104 is coupled to the second arm-end 248 of the first arm 142. The first arm-end 246 of the second arm 144 is coupled to the support beam 140, for example, via the second arm-drive mechanism 238. The second scanner 106 is coupled to the second arm-end 248 of the second arm 144.

In an example, each of the first arm 142 and the second arm 144 is oblique to the Y-axis. The first arm 142 and the second arm 144 being oblique to the Y-axis locates the first scanner 104 and the second scanner 106 at an appropriate Z-location so that the first field of view 108 and the second field of view 110 are not obstructed by the support beam 140 during the scanning operation. In other words, the first arm 142 and the second arm 144 being oblique to the Y-axis keeps the first scanner 104 and the second scanner 106 above the support beam 140 regardless of the location of the first arm 142 and the second arm 144 along the Z-axis.

The first arm 142 being oblique to the Y-axis also initially locates the first scanner 104 at a Z-location closer to the part 200 at initiation of the scanning operation. Similarly, the second arm 144 being oblique to the Y-axis also initially locates the second scanner 106 at a Z-location closer to the part 200 at initiation of the scanning operation.

In an example, the first arm 142 and the second arm 144 are oriented at any desirable oblique angle relative to the Y-axis. In an example, the first arm 142 and the second arm 144 are oriented at the same oblique angle relative to the Y-axis. In an example, the first arm 142 and the second arm 144 are oriented at different oblique angles relative to the Y-axis. In an example, the oblique angle is approximately forty-five degrees. In an example, the oblique angle is approximately sixty degrees.

Figure 4:
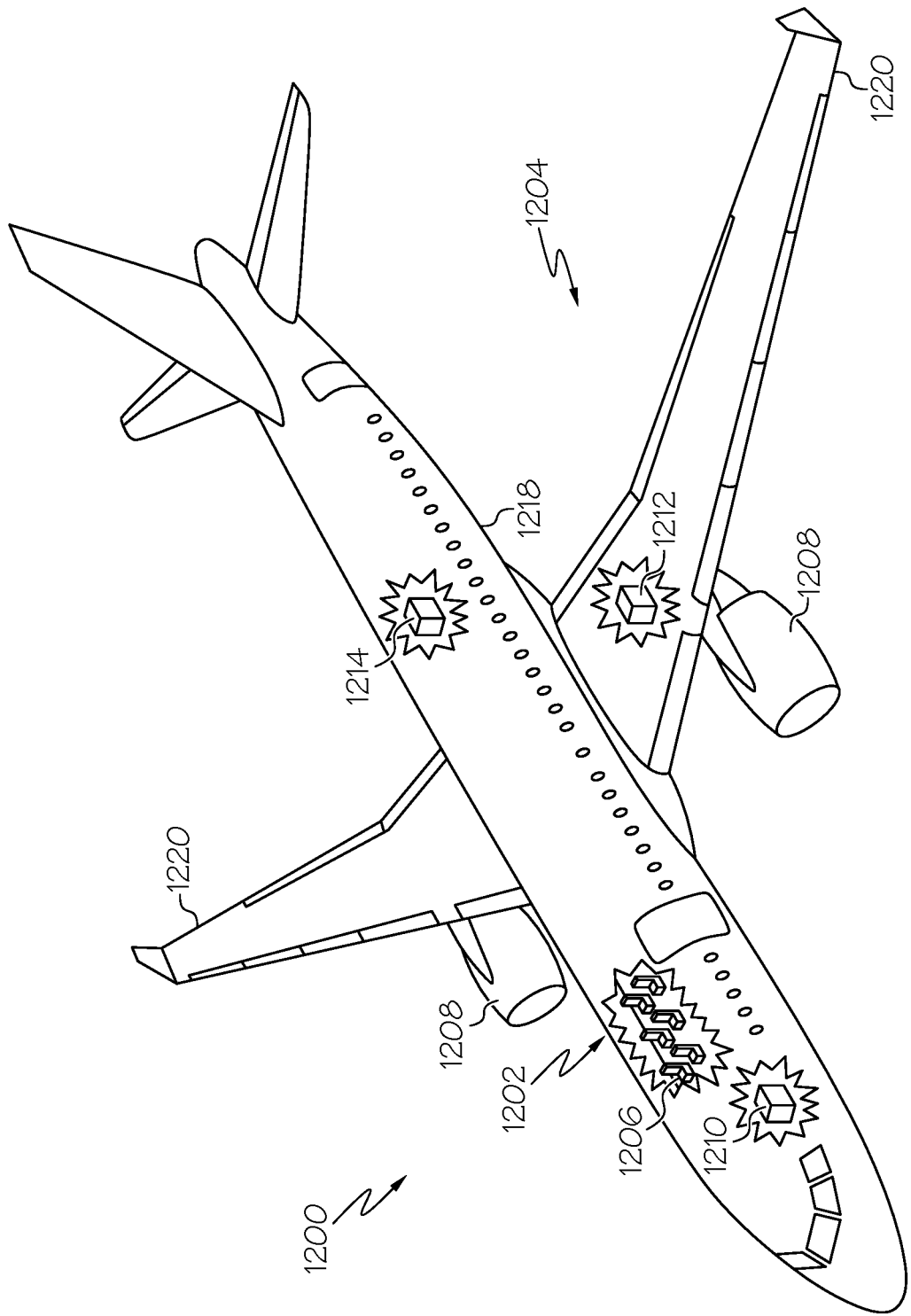
FIG. 4 is a schematic illustration of an example of an aircraft.

Referring now to FIG. 4, in one or more examples, the part 200 is a structure, a sub-structure, an assembly, a sub-assembly, a component, or other part of an aircraft 1200. For example, the part 200 is any one of a wing section, a fuselage section, a stinger, a spar, a rib, a frame, an interior panel, and an exterior skin panel of the aircraft 1200 or a component thereof.

Figure 5:
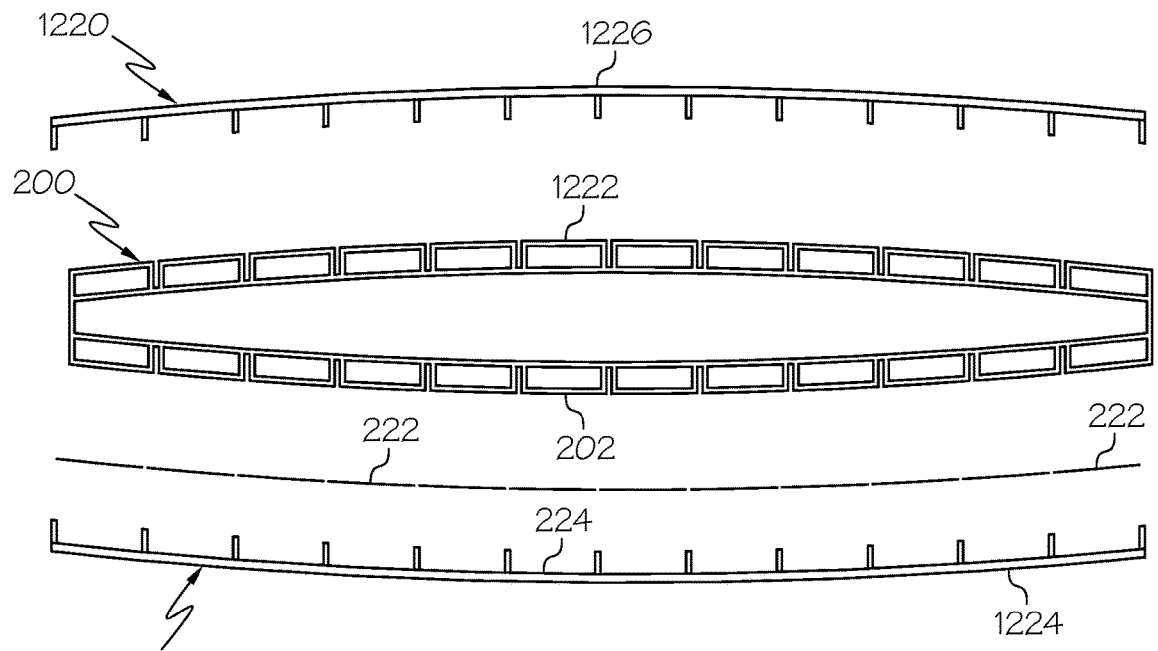
FIG. 5 is a schematic illustration of an example of a part that is scanned using the scanning apparatus of FIG. 1.
Figure 7:
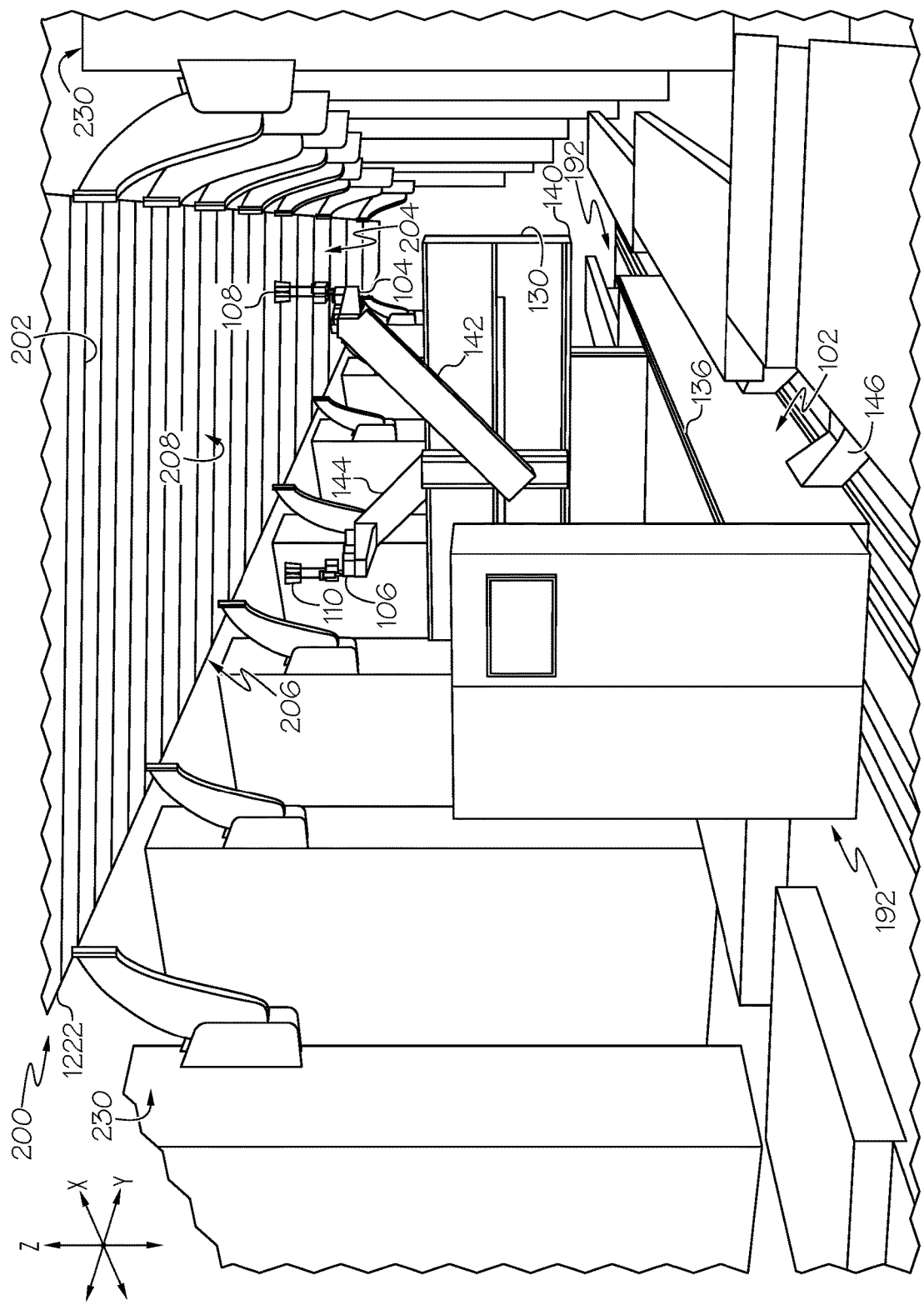
FIG. 7 is a schematic, perspective view of an example of the scanning apparatus of FIG. 1, located at one of a plurality of scan locations relative to the part.

Referring to FIG. 5, in one or more examples, the part 200 is a portion of a wing 1220 of the aircraft 1200 (FIG. 4). The wing 1220 includes a frame 1222, at least one lower panel 1224, and at least one upper panel 1226. In one or more examples, an underside surface of the part 200 is the surface 202 being scanned by the scanning apparatus 100. For instance, in an example, an underside surface of the frame 1222 is the surface being scanned by the scanning apparatus 100. In this example, the scanning apparatus 100 is located under the frame 1222, for example, as illustrated in FIG. 7.

The frame 1222 forms the underlying support structure for the wing 1220 and includes a combination of structural components, such as stringers, spars, and ribs. The lower panel 1224 is coupled to the frame 1222 and forms a portion of the exterior skin of the wing 1220. The upper panel 1226 is coupled to the frame 1222, opposite the lower panel 1224, and forms a portion of the exterior skin of the wing 1220.

In the illustrative example, the part 200 is the frame 1222 and the second part 220 is the lower panel 1224. In this example, the underside surface of the frame 1222 is the surface being scanned by the scanning apparatus 100. In another example, the part 200 is the lower panel 1224 and the second part 220 is the frame 1222. In this example, an interior surface of the lower panel 1224 is the surface being scanned by the scanning apparatus 100. In these examples, shims 222 are used to fill gaps between mating surfaces of the frame 1222 and the lower panel 1224.

In yet another example, the part 200 is the frame 1222 and the second part 220 is the upper panel 1226. In this example, shims 222 are used to fill gaps between mating surfaces of the frame 1222 and the upper panel 1226.

Each of the frame 1222, the lower panel 1224, the upper panel 1226, and the shims 222 is made of any suitable material, such as a metallic material, a composite material, or a combination of materials.

The present disclosure recognizes that during assembly of the wing 1220, gaps may be formed between mating surfaces of the frame 1222 and the lower panel 1224. For example, gaps may exist between a lower surface of the frame 1222 and an upper surface of the lower panel 1224 in the Z-direction. Certain ones of these gaps may be filled with shims 222. Gaps between the lower surface of the frame 1222 and the upper surface of the lower panel 1224 may be difficult to identify and measure due to the orientation of the wing 1220 and the effects of gravity on the lower panel 1224 during assembly of the wing 1220. Accordingly, it is desirable to predict shim gaps prior to assembly of the wing 1220.

In the illustrative example, the shims 222 are a result of predictive shimming. In an example, the shims 222 are fabricated based on differences between the surface 202 of the part 200 and the design of the part 200. In another example, the shims 222 are fabricated based on differences between the surface 202 of the part 200 and a second surface 224 of the second part 220. In yet another example, the shims 222 are fabricated based on differences between the second surface 224 of the second part 220 and a design of the second surface 224 of the second part 220.

In the illustrative example, differences between the surface 202 of the part 200 and the design of the part 200 or between the surface 202 of the part 200 and the second surface 224 of the second part 220 are in the Z-direction, normal to the surface 202 of the part 200. Gaps having dimensions outside of a predetermined tolerance may be filled with shims 222. In these examples, the shims 222 are used to fill the gaps in a direction normal to the surface 202 of the part 200. Although the differences are described in the Z-direction, differences may exist in any direction or along any axis.

Figure 6:
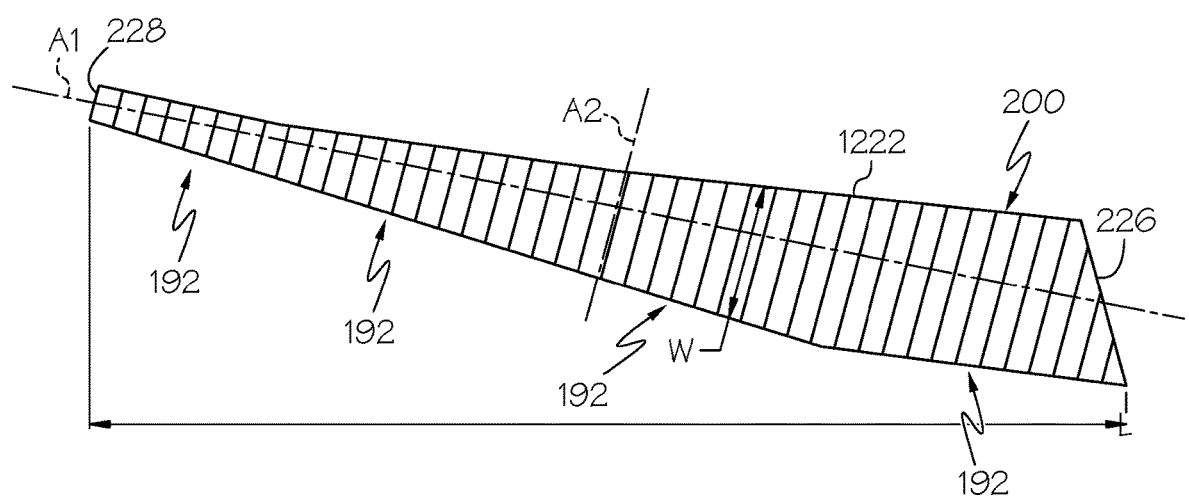
FIG. 6 is a schematic illustration of an example of the part that is scanned using the scanning apparatus of FIG. 1.

Referring to FIG. 6, generally, the part 200 has a length L measured along a longitudinal axis A1 and a width W measured transverse to the longitudinal axis A. In the illustrative example, the part 200 is the frame 1222 of the wing 1220 (FIG. 5). In an example, the width W of the part 200 decreases along the longitudinal axis from a first part-end 226 to a second part-end 228, opposite the first part-end 226. In such an example, a maximum width of the part 200 is proximate to the first part-end 226 and a minimum width of the part 200 is proximate to the second part-end 228. For example, the frame 1222 tapers from root to tip.

In an example, the part 200 is asymmetric about the longitudinal axis A1. In an example, the part 200 is asymmetric about a transverse axis A2 that is perpendicular to the longitudinal axis A1. In an example, the part 200 has a curvature along at least one of the longitudinal axis A1 and the transverse axis A2. For example, the frame 1222 has an in-plane curvature and an out-of-plane curvature.

Referring to FIG. 7, in an example, the part 200 is secured horizontally, in an overhead position. For example, a holding fixture 230 is used to hold the part 200 in a horizontal orientation at the overhead position. In an example, the scanning operation performed by the scanning apparatus 100 and a subsequent manufacturing operation, such as placement of shims 222 (FIG. 5) and assembly of the part 200 with the second part 220, are performed at the same location in the manufacturing environment. Co-locating the scanning operation and at least one manufacturing operation reduces manufacturing cycle time and cost.

In an example, the scanning platform 102 is configured to be moved to any one of a plurality of scan locations 192 (FIG. 6) relative to the part 200. For instance, in an example, the scanning platform 102 is configured to be moved to any one of the plurality of scan locations 192 underneath the part 200 (e.g., the frame 1222), as illustrated in FIG. 7. For example, the scanning platform 102 is configured to be moved sequentially through the plurality of scan locations 192 relative to an underside of the frame 1222 of the wing 1220.

The example shown in FIG. 7 illustrates the scanning platform 102 at one of the plurality of scan locations 192 relative to the part 200. In one or more examples, the scanning platform 102 is movable (e.g., is configured to be moved or is configured to move) to any one of the plurality of scan locations 192 (FIG. 6) under the part 200 to position the first scanner 104 and the second scanner 106 relative to an underside surface of the part 200 (e.g., the frame 1222). In this example, the underside surface of the part 200 is the surface 202 being scanned by the scanning apparatus 100.

As illustrated in FIG. 7, with the scanning platform 102 at one of the plurality of scan locations 192, the first scanner 104 and the second scanner 106 are moved relative to the part 200 and are located at corresponding initial X-locations based on movement of the carriage 138 relative to the base 136 along the X-axis. The first scanner 104 and the second scanner 106 are further moved relative to the part 200 and are located at corresponding initial Z-locations based on movement of the support beam 140 relative to the carriage 138 along the Z-axis.

While at a corresponding initial X-location, the first scanner 104 is further moved relative to the part 200 along the first scan path, based on movement of the first arm 142 relative to the support beam 140 along the Y-axis and, optionally, the Z-axis. Similarly, while at the corresponding initial X-location, the second scanner 106 is further moved relative to the part 200 along the second scan path, based on movement of the second arm 144 relative to the support beam 140 along the Y-axis and, optionally, the Z-axis. Each one of the first scanner 104 and the second scanner 106 performs at least one pass, along the respective scan path, to collect the scan data 184, representing an initial portion of the surface 202 of the part 200.

It should be appreciated that, with the part 200 coupled to the holding fixture 230, the relative location of the part 200 in the manufacturing environment is known. Further, the relative location of each one of the first scanner 104 and the second scanner 106 is known, for example, based on the location data 186 (FIG. 1) provided by the sensors 240 (FIG. 1). Therefore, the scanning platform 102 is configured to automatically move the first scanner 104 and the second scanner 106 relative to the part 200, under computer control, based on the known location of the part 200 and the known locations of the first scanner 104 and the second scanner 106.

Movement of the first scanner 104 and the second scanner 106 along the Y-axis accounts for the width W (FIG. 6) of the part 200 and enables each one of the first scanner 104 and the second scanner 106 to scan the surface 202 over at least a portion of the width W of the part 200 and to form the scan data 184, representing at least a portion of the surface 202. For example, as best illustrated in FIGS. 6 and 7, at one or more of the plurality of scan locations 192 (FIG. 6) proximate to the first part-end 226 (FIG. 6), the first arm 142 and the second arm 144 are movable in opposite directions other along the Y-axis, further away from each other, so that the first scanner 104 and the second scanner 106 are capable of scanning an entirety of the width W (e.g., a maximum width $W_{MAX}$ (FIG. 26)) of the part 200. At one or more of the plurality of scan locations 192 proximate to the second part-end 228 (FIG. 6), the first arm 142 and the second arm 144 are moveable in opposite directions along the Y-axis, closer to each other, so that the first scanner 104 and the second scanner 106 are capable of scanning an entirety of the width W (e.g., a minimum width $W_{MIN}$ (FIG. 27)) of the part 200.

Accordingly, connection of the first scanner 104 to the first arm 142 and connection of the second scanner 106 to the second arm 144 increases the scan width of the scanning apparatus 100. Increasing the scan width advantageously reduces the time required to fully scan the part 200. Additionally, increasing the scan width may reduce the number of passes of the first scanner 104 and the second scanner 106 across the part 200.

In an example, during movement of the first scanner 104 and the second scanner 106 along the Y-axis (e.g., following the respective first scan path and second scan path), at least a portion of the surface 202 is scanned by both the first scanner 104 and the second scanner 106. Thus, at least a portion of the scan data 184 from each one of the first scanner 104 and the second scanner 106 represents the same portion of the surface 202 of the part 200.

Movement of the first scanner 104 and the second scanner 106 along the Z-axis accounts for out-of-plane curvatures of the part 200, such as portions of the part 200 that have different Z-locations along the width W of the part 200, and enables the first scanner 104 and the second scanner 106 to remain a consistent offset distance from the part 200 during the scanning operation.

Once the first scanner 104 and the second scanner 106 have completed scanning the initial portion of the part 200 at the initial X-locations, the scanning platform 102 is configured to move the first scanner 104 and the second scanner 106 further along the X-axis so that a subsequent portion of the part 200, along the length L (FIG. 6) of the part 200, can be scanned. For example, with the scanning platform 102 remaining at the same one of the plurality of scan locations 192 (FIG. 6), the first scanner 104 and the second scanner 106 are moved relative to the part 200 and are located at corresponding subsequent X-locations based on movement of the carriage 138 relative to the base 136 along the X-axis. In one or more examples, the first scanner 104 and the second scanner 106 are further moved relative to the part 200 and are located at corresponding subsequent Z-locations based on movement of the support beam 140 relative to the carriage 138 along the Z-axis.

While at a corresponding subsequent X-location, the first scanner 104 is further moved relative to the part 200 along the first scan path, based on movement of the first arm 142 relative to the support beam 140 along the Y-axis and, optionally, the Z-axis. Similarly, while at the corresponding subsequent X-location, the second scanner 106 is further moved relative to the part 200 along the second scan path, based on movement of the second arm 144 relative to the support beam 140 along the Y-axis and, optionally, the Z-axis. Each one of the first scanner 104 and the second scanner 106 performs at least one pass, along the respective scan path, to collect the scan data 184, representing a subsequent portion of the surface 202 of the part 200.

The process described above is repeated along at least portion of the length L (FIG. 6) of the part 200 by further subsequent movements of the carriage 138 relative to the base 136 along the X-axis. Further subsequent movements of the carriage 138 along the X-axis, in turn, move the first scanner 104 and the second scanner 106 relative to the part 200, along the length L of the part 200, and locate the first scanner 104 and the second scanner 106 at corresponding further subsequent X-locations.

In an example, the base 136 is an elongate member that has a length that enables a substantial portion of the length L of the part 200 (FIG. 6) to be scanned at one of the scan locations 192 of the scanning platform 102 relative to the part 200. For example, the carriage 138 is configured to move between a first base-end 250 of the base 136 and a second base-end 252 of the base 136, opposite to the first base-end 250 (FIGS. 2 and 3). Movement of the carriage 138 along the X-axis from the first base-end 250 to the second base-end 252 accommodates at least a portion of the length L of the part 200.

In situations in which the length L of the part 200 (FIG. 6) is greater than the length of the base 136, the scanning platform 102 is configured move to a subsequent one of the plurality of scan locations 192 (FIG. 6) relative to (e.g., underneath) the part 200. Once the scanning platform 102 is moved to the subsequent one of the plurality of scan locations 192 relative to the part 200, such as further down the length L of the part 200, the process described above is repeated along a subsequent portion of the length L of the part 200.

Referring briefly back to FIGS. 2 and 3, in an example, the scanning platform 102 includes a plurality of wheel assemblies 146. Each one of the wheel assemblies 146 is coupled to the base 136. The wheel assemblies 146 enable the scanning platform 102 to move along a floor of the manufacturing environment relative to the part 200.

In an example, each one of the wheel assemblies 146 includes at least one of a wheel and a roller. The wheel is coupled to a drive train that is configured to drive rotation of the wheel and, thus, propel the scanning platform 102. The roller is freely rotatable and, thus, enables the scanning platform 102 to be moved by application of an external force.

In an example, at initiation of the scanning operation, the scanning platform 102 is moved to a first one of the plurality of scan locations 192 relative to the part 200, such as under a horizontally oriented part 200. At the first one of the scan locations 192, the first scanner 104 and the second scanner 106 scan a first portion of the length L (FIG. 6) of the part 200, such as a first section of the part 200. After scanning the first portion of the length L of the part 200, the scanning platform 102 is moved to a second one of the plurality of scan locations 192 (FIG. 6) relative to the part 200. At the second one of the scan locations 192, the first scanner 104 and the second scanner 106 scan a second portion of the length L of the part 200, such as a second section of the part 200. This process is repeated over the entire length L of the part 200. After scanning the entire length L of the part 200, the scanning platform 102 is moved away from the part 200 and a subsequent manufacturing operation, such as placing shims 222 (FIG. 5) or part assembly, may be performed.

In an example, the scanning platform 102, such as the base 136 and the wheel assemblies 146 of the scanning platform 102, take the form of, or serve, as a manually guided vehicle. For example, an operator may provide steering inputs to the scanning platform 102 to move the scanning platform 102 throughout the manufacturing environment.

In another example, the scanning platform 102, such as the base 136 and the wheel assemblies 146, take the form of, or serve as, an automated guided vehicle (AVG). For example, the scanning platform 102 is configured to automatically follow along a predefined travel path within the manufacturing environment. The manufacturing environment includes at least one automated guide system that is configured to guide the scanning platform 102 along the predefined travel path. Examples of the automated guide system include, but are not limited to, tracks, wires, guide tape, laser target navigation systems, vision guidance systems, and the like.

Figure 8:
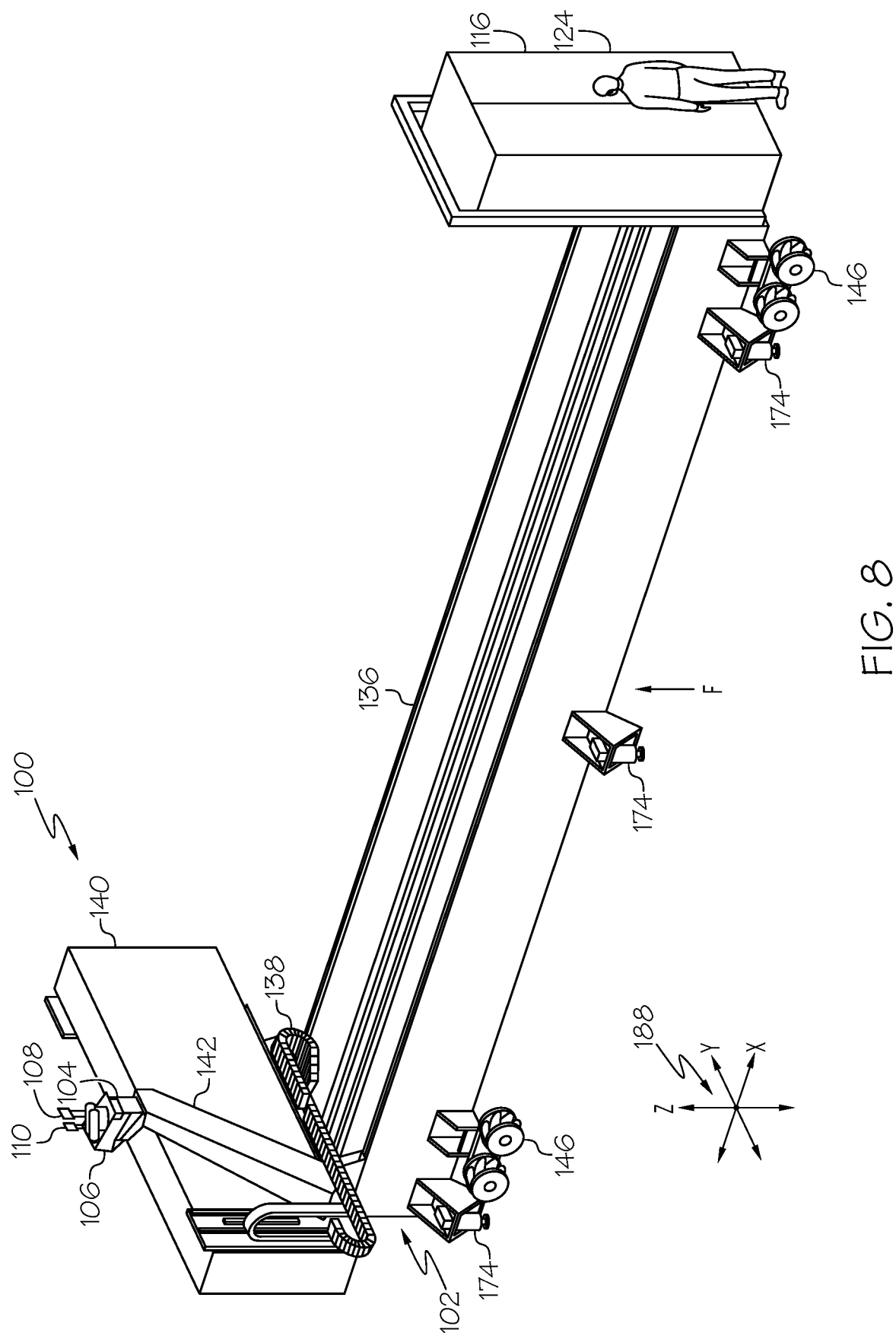
FIG. 8 is a schematic, perspective view of an example of the scanning apparatus of FIG. 1.

Referring to FIG. 8, in an example, the scanning platform 102 includes a plurality of jacks 174. Each one of the plurality of jacks 174 is coupled to the base 136 and is configured to engage the floor of the manufacturing environment. The plurality of jacks 174 is configured to apply a constant force F to the base 136 so that the base 136 maintains a repeatable shape at each one of the plurality of scan locations 192 (FIG. 7).

In an example, each one of the plurality of the jacks 174 includes a rigid body and an actuator that is configured to apply the constant force F to the base 136. For example, each one of the jacks 174 includes a suitable a linear actuator, such as a mechanical actuator, a pneumatic actuator, or a hydraulic actuator. Accordingly, the jacks 174 beneficially stabilize the base 136 of the scanning platform 102 during the scanning operation and enable the base 136 to maintain the repeatable shape.

The present disclosure recognizes that, in certain circumstances, a manufacturing floor is not completely flat. Accordingly, at each one of the scan locations 192 (FIG. 7), the base 136 of the scanning platform 102 may have a different machine shape. The disclosed scanning apparatus 100 accounts for variations in the manufacturing floor by applying the constant force F to the base 136. Beneficially, the jacks 174 return the shape of the base 136 to a compensated and repeatable shape, rather than the floor shape, which improves the accuracy of the scanning operation of the surface 202 of the part 200, e.g., the underside of the frame 1222 of the wing 1220, and thus, the accuracy of the predictive shimming operation.

In an example, each one of the jacks 174 includes a load cell that is configured to sense the initial force placed on the jack 174 by the scanning platform 102 when the scanning platform 102 is set up at an initial scan location. With the X-axis being a known and repeatable position, the jacks 174 apply the constant force F, set to equalize the initial force. Accordingly, at each subsequent scan location of the scanning platform 102, the constant force F applied to the base 136 by the jacks 174 returns the base 136 to the same (e.g., repeatable) shape it had at the initial scan location, regardless of the condition of the manufacturing floor. Additionally, in an example, the scanning platform 102 is calibrated to compensate for changed in machine shape during the scanning operation.

Figure 9:
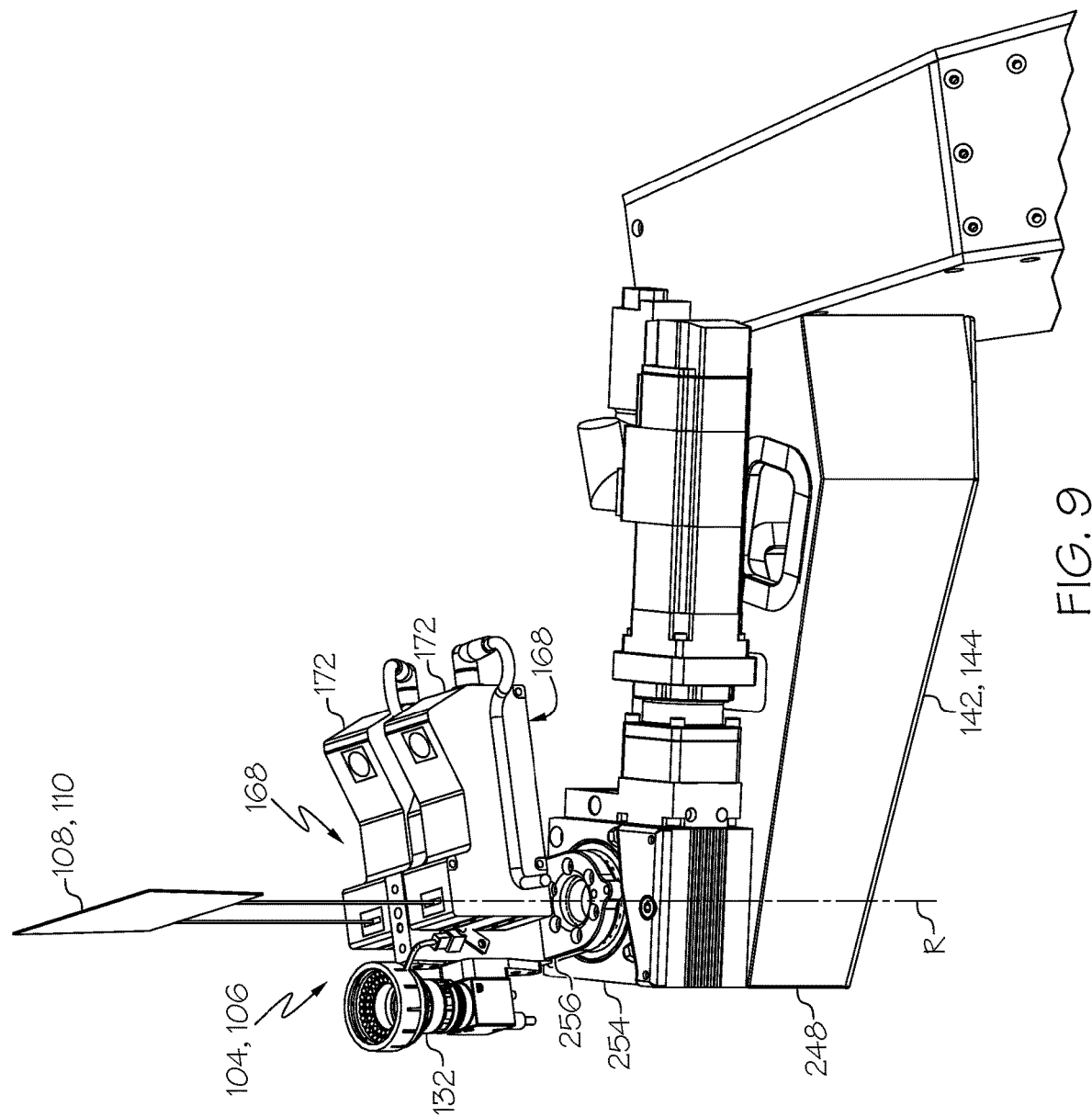
FIG. 9 is a schematic, perspective view of an example of a scanner of the scanning apparatus of FIG. 1.

Referring to FIG. 9, in an example, the first scanner 104 and the second scanner 106 are independently movable relative to a part 200. For example, the scanning platform 102 is configured to independently move the first scanner 104 and the second scanner 106 relative to each other along the Y-axis and, optionally, the Z-axis via respective movement of the first arm 142 and the second arm 144 relative to the support beam 140. It should be appreciated that FIG. 9 illustrates an example of a portion of one arm and associated scanner of the scanning apparatus 100, which represents the first arm 142 and the first scanner 104 and the second arm 144 and the second scanner 106.

In an example, the first scanner 104 is rotatable relative to the first arm 142. Similarly, the second scanner 106 is rotatable relative to the second arm 144. For example, the first scanner 104 rotates about a corresponding rotational axis R relative to the first arm 142 and the second scanner 106 rotates about a corresponding rotational axis R relative to the second arm 144. In the illustrative example, the rotational axis R is parallel with the Z-axis (e.g., is generally vertical).

Rotation of the first scanner 104 relative to the first arm 142 advantageously increases the maximum scanning measurement area provided by the first scanner 104. Similarly, rotation of the second scanner 106 relative to the second arm 144 advantageously increases the maximum scanning measurement area provided by the second scanner 106. Additionally, rotation of the first scanner 104 relative to the first arm 142 and rotation of the second scanner 106 relative to the second arm 144 beneficially enables the scanning mechanism (e.g., laser light) to be selectively oriented parallel the part 200 being scanned. For example, ribs of the frame 1222 (FIGS. 5 and 6) and spars of the frame 1222 are perpendicular to each other. Therefore, in this example, the first scanner 104 and/or the second scanner 106 are rotated approximately ninety degrees between the rib and the spar during the scanning operation.

In an example, the first scanner 104 and the second scanner 106 include one or more additional degrees of freedom relative to the first arm 142 and the second arm 144, respectively. For example, the first scanner 104 also rotates about a corresponding second rotational axis (not shown) relative to the first arm 142 and the second scanner 106 also rotates about a corresponding second rotational axis (not shown) relative to the second arm 144. In the illustrative example, the second rotational axis is perpendicular to the rotational axis R (e.g., is generally horizontal or parallel with the Y-axis). Rotation of the first scanner 104 and/or the second scanner 106 about the corresponding second rotational axis beneficially enables the scanning apparatus 100 to maintain laser light, emitted from a corresponding one of the first scanner 104 and the second scanner 106, perpendicular to the surface being scanned.

In an example, the scanning platform 102 includes a connection assembly 254 associated with each one of the first arm 142 and the second arm 144. The connection assembly 254 of the first arm 142 is configured to enable attachment of the first scanner 104 to the first arm 142. The connection assembly 254 of the second arm 144 is configured to enable attachment of the second scanner 106 to the second arm 144.

The connection assembly 254 includes any suitable mechanical attachment that connects and properly aligns the first scanner 104 with the first arm 142 and the second scanner 106 with the second arm 144. Connecting the first scanner 104 and the second scanner 106 to the scanning platform 102 using the connection assembly 254 enables a single set-up operation. The connection assembly 254 also enables the first scanner 104 and the second scanner 106 to be easily and simply replaced.

In an example, the scanning platform 102 includes a scanner-drive mechanism 256 associated with each one of the first arm 142 and the second arm 144. The scanner-drive mechanism 256 of the first arm 142 is operatively coupled to the first scanner 104. The scanner-drive mechanism 256 of the first arm 142 is configured to rotate the first scanner 104 relative to the first arm 142, such as about the rotational axis R. The scanner-drive mechanism 256 of the second arm 144 is operatively coupled to the second scanner 106. The scanner-drive mechanism 256 of the second arm 144 is configured to rotate the second scanner 106 relative to the second arm 144, such as about the rotational axis R.

The scanner-drive mechanism 256 includes any suitable drive assembly configured to accurately and repeatably rotate a corresponding one of the first scanner 104 and the second scanner 106 relative to a respective one of the first arm 142 and the second arm 144. In an example, the scanner-drive mechanism 256 includes a drive component, configured to generate a driving force sufficient to rotate the corresponding one of the first scanner 104 and the second scanner 106. The scanner-drive mechanism 256 also includes a transmission component, configured to transfer the driving force from the drive component to the corresponding one of the first scanner 104 and the second scanner 106.

In an example, the scanner-drive mechanism 256 is a rotary drive assembly, such as a mechanical drive assembly, a pneumatic drive assembly, or a hydraulic drive assembly. For example, the scanner-drive mechanism 256 includes a servomotor (the drive component) and a bearing assembly (the transmission component).

In an example, at least one of the sensors 240 is associated with each one of the first scanner 104 and the second scanner 106 and is configured to detect the rotational orientation of or measure the rotational movement of each one of the first scanner 104 and the second scanner 106. In this example, the location data 186 includes information related to rotation of the first scanner 104 and the second scanner 106, which is used to determine the orientation of each one of the first scanner 104 and the second scanner 106, for example, relative to the fixed coordinate system 188 and, thus, relative to the part 200.

In an example, the scanning platform 102 includes an indexing component (not shown) that is configured to repeatably and automatically index the first scanner 104 and the second scanner 106 relative to the scanning platform 102 under computer control. Preferably, the indexing component has sufficient accuracy to enable a single calibration of the first scanner 104 and the second scanner 106 to be applied to subsequent scanning operations. Use of a single (e.g., reusable) calibration reduces the set-up time required for inspection of the part 200.

In an example, each one of the first scanner 104 and the second scanner 106 includes at least one laser scanner 168. The laser scanner 168 includes any suitable laser scanning device that is configured to emit laser light and collect the laser light deflected back from a surface. The scan data 184 is generated based on information from the collected laser light.

In an example, the laser scanner 168 is a two-dimensional (2D) laser scanner. In another example, the laser scanner 168 is a three-dimensional (3D) Laser scanner.

In an example, the first scanner 104 includes a pair of the laser scanners 168. Similarly, in an example, the second scanner 106 includes the pair of laser scanners 168. Use of the pair of laser scanner 168 beneficially increases the field of view of the associated first scanner 104 and the second laser scanner 106 and enables a larger portion of the surface 202 to be scanned per pass. In an example, a combined field of view of the pair of laser scanners 168 of the first scanner 104 forms the first field of view 108. Similarly, a combined field of view of the pair of laser scanners 168 of the second scanner 106 forms the second field of view 110.

In an example, the laser scanner 168 includes, or takes the form of, a laser profilometer 172. The laser profilometer 172 advantageously provides fast and accurate measurements of a surface profile of the surface 202 of the part 200.

Referring generally to FIG. 1 and particularly to FIG. 9, in an example, the scanning apparatus 100 includes a first camera 132 and a second camera 134. The first camera 132 is coupled to the scanning platform 102 and is configured to form (e.g., generate or obtain) a first image 194 (FIG. 1) of the first portion 204 of the part 200. The second camera 134 is coupled to the scanning platform 102 and is configured to form (e.g., generate or obtain) a second image 196 (FIG. 1) of the second portion 206 of the part 200. The scanning platform 102 is configured to move the first camera 132 along the X-axis, the Y-axis, and the Z-axis with the first scanner 104. The scanning platform 102 is configured to move the second camera 134 along the X-axis, the Y-axis, and the Z-axis with the second scanner 106.

In an example, each one of the first image 194 and the second image 196 is a still image or a frame of a video. The first image 194 and the second image 196 are processed and used to identify an inconsistency 218 (FIG. 1) on the part 200. For example, the scanning apparatus 100 is configured to determine whether the inconsistency 218 is present on the surface 202 of the part 200.

In an example, the first camera 132 is coupled to the second arm-end 248 of the first arm 142 adjacent to the first scanner 104. In this example, the first image 194, formed by the first camera 132, is a visual representation of the portion of the surface 202 scanned by the first scanner 104 at any given Y-location along the first scan path. For example, the first image 194 depicts the portion of the surface 202 disposed within the first field of view 108 of the first scanner 104. In an example, the first camera 132 is coupled to the first arm 142 with the first scanner 104 via the connection assembly 254. In an example, the first camera 132 rotates about the rotational axis R with the first scanner 104.

In an example, the second camera 134 is coupled to the second arm-end 248 of the second arm 144 adjacent to the second scanner 106. In this example, the second image 196, formed by the second camera 134, is a visual representation of the portion of the surface 202 scanned by the second scanner 106 at any given Y-location along the second scan path. For example, the second image 196 depicts the portion of the surface 202 disposed within the second field of view 110 of the second scanner 106. In an example, the second camera 134 is coupled to the second arm 144 with the second scanner 106 via the connection assembly 254. In an example, the second camera 134 rotates about the rotational axis R with the second scanner 106.

Referring to FIG. 1, in an example, while moving the first scanner 104 along the Y-axis, the first scanner 104 is configured to form (e.g., acquire or generate) first scan-data 112 (FIG. 1). The first scan-data 112 represents the first portion 204 of the part 200. While moving the second scanner 106 along the Y-axis, the second scanner 106 is configured to form (e.g., acquire or generate) second scan-data 114 (FIG. 1). The second scan-data 114 represents the second portion 206 of the part 200. The first portion 204 of the part 200 and the second portion 206 of the part 200 at least partially overlap each other so that a first subset 120 (FIG. 1) of the first scan-data 112 and a second subset 122 (FIG. 1) of the second scan-data 114 represent an overlap 208 of the first portion 204 of the part 200 and the second portion 206 of the part 200.

For example, the first scanner 104 scans the first portion 204 of the surface 202 to form the first scan-data 112 and the second scanner 106 scans the second portion 206 of the surface 202 to form the second scan-data 114. At least a portion of the first portion 204 and at least a portion of the second portion 206 are the same portion of the surface 202. Accordingly, the first subset 120 of the first scan-data 112 and the second subset 122 of the second scan-data 114 represent the same portion of the surface 202 formed by overlapping portions of the first portion 204 and the second portion 206, referred to herein as the overlap 208.

In an example, the overlap 208 includes at least one structural feature 216 (FIG. 1) of the part 200, for example, formed by the surface 202 of the part 200. Examples of the structural feature 216 include, but are not limited to, a machined feature (e.g., a fastener hole), an edge, an intersection of two portions of the surface 202, a joint between two components of the part 200, and the like.

The first scan-data 112 and the second scan-data 114 are examples of the scan data 184 and can take any desirable form. In an example, the first scan-data 112 and the second scan-data 114 include, or take the form of, a series of data points. In an example, the first subset 120 of the first scan-data 112 and the second subset 122 of the second scan-data 114 provide a greater sampling in areas of interest of the surface 202. As an example, the first subset 120 and the second subset 122 provide a greater sampling of data points for the overlap 208 of the surface 202. As another example, the first subset 120 and the second subset 122 provide a greater sampling of data points in areas of the surface 202 where the part 200 will mate with the second part 220.

Generally, the scan data 184 (e.g., the first scan-data 112 and the second scan-data 114) are stored in any desirable location. In an example, the scan data 184 is stored in a computer (e.g., computer 116 (FIG. 1)), such as in internal memory of the computer. In another example, the scan data 184 is stored in a different location.

In an example, the scan data 184 is selectively extracted and stored. For example, although the first scanner 104 and the second scanner 106 scan an entirety of the surface 202 of the part 200, data points within select areas of interest are extracted and saved. As an example, data points representing the overlap 208 (e.g., the first subset 120 and the second subset 122) are extracted and saved.

In an example, the scan data 184 is selectively extracted and discarded. For example, although the first scanner 104 and the second scanner 106 scan an entirety of the surface 202 of the part 200, data points within select areas of interest are extracted and discarded. As an example, data points representing the inconsistency 218 (FIG. 1) are extracted and discarded.

In an example, the first scan-data 112 and the second scan-data 114 are used to create predicted shims. Differences between the surface 202 of the part 200 and the design of the part 200 or between the surface 202 of the part 200 and a second surface 224 of the second part 220 are determined using the first scan-data 112 and the second scan-data 114. The shims 222 are fabricated based on such differences.

In another example, the first scan-data 112 and the second scan-data 114 are used to perform shimless manufacturing. Differences between the surface 202 of the part 200 and the design of the part 200 are determined using the first scan-data 112 and the second scan-data 114. A design of the second surface 224 of the second part 220 is modified using the such differences to form a modified design. The modified design of the second surface 224 of the second part 220 is configured to mate with the surface 202 of the part 200 and eliminates shims between the part 200 and the second part 220 for shimless manufacturing.

Referring to FIG. 1, in an example, the scanning apparatus 100 includes a computer 116. The computer 116 is in communication with the first scanner 104 and the second scanner 106. The computer 116 is configured to receive the first scan-data 112 from the first scanner 104 and to receive the second scan-data 114 from the second scanner 106.

The computer 116 includes a processor 118. The processor 118 is configured to align the first subset 120 of the first scan-data 112 and the second subset 122 of the second scan-data 114 based on the overlap 208 of the first portion 204 of the part 200 and the second portion 206 of the part 200.

It can be appreciated that the scan data 184, representing the entire surface 202 of the part 200, is formed by sets of the first scan-data 112, representing discrete portions of the surface 202, and sets of the second scan-data 114, representing other discrete portions of the surface 202. Alignment of the first subset 120 and the second subset 122 enables the first scan-data 112 and the second scan-data 114 to be accurately combined. Accordingly, transforming the first scan-data 112 and the second scan-data 114, based on alignment of the first subset 120 and the second subset 122, provides an accurate representation of the geometry (e.g., the surface profile) of the entire surface 202 of the entire part 200.

In an example, the processor 118 is configured to generate the model 130 of the part 200 using the first scan-data 112 and the second scan-data 114. In an example, the processor 118 is configured to determine the differences between the surface 202 of the part 200 and the design of the part 200 or between the surface 202 of the part 200 and the second surface 224 of the second part 220 using the first scan-data 112 and the second scan-data 114. As described above, shims 222 (FIG. 5) are fabricated based on such differences.

In an example, the processor 118 is configured to identify the inconsistency 218 on the surface 202 of the part 200 from the first image 194, provided by the first camera 132, and the second image 196, provided by the second camera 134. In an example, the processor 118 performs an image processing or other machine vision operation to determine the presence of the inconsistency 218. When the inconsistency 218 is identified, the processor 118 is configured to correlate the location of the inconsistency 218 relative to the image with data points representing the location of the inconsistency 218. The processor 118 is configured to extract and discard the data points representing the inconsistency 218.

The present disclosure recognizes that the inconsistency 218 located on the surface 202 of the part 200 may result in inaccurate scan data 184. Thus, it is desirable to remove data points representing the inconsistency 218 from the scan data 184. Examples of the inconsistency 218 include, but are not limited to, tape, sealant, and the like.

In an example, the computer 116 is in communication with the sensors 240. In an example, the processor 118 is configured to receive the location data 186 from the sensors 240 and determine the relative locations of the first scanner 104 and the second scanner 106 using the location data 186.

In an example, the scanning apparatus 100 includes a controller 124. The controller 124 is in communication with the scanning platform 102. Generally, the controller 124 is configured to control operation of the components of the scanning apparatus 100. For example, the controller 124 is configured to selectively control movement of carriage 138 relative to the base 136, movement of the support beam 140 relative to the carriage 138, movement of the first arm 142 relative to the support beam 140, movement of the second arm 144 relative to the support beam 140, movement of the first scanner 104 relative to the first arm 142, and movement of the second scanner 106 relative to the second arm 144. In an example, the controller 124 is configured to control actuation of the first scanner 104 to form the first scan-data 112, actuation of the second scanner 106 to form the second scan-data 114, actuation of the first camera 132 to form the first image 194, and actuation of the second camera 134 to form the second image 196.

In an example, the controller 124 is in communication with the computer 116. As such, the controller 124 is configured to move the first scanner 104 and the second scanner 106 relative to the part 200 based on the known location of the part 200 and the known locations of the first scanner 104 and the second scanner 106.

In an example, the controller 124 incudes, or takes the form of, a computer numerical control (CNC) system. Controlling movement of the first scanner 104 and the second scanner 106 to the controller 124 provides a desirably high degree of accuracy and precision to movement of the first scanner 104 and the second scanner 106 relative to the part 200. The first scanner 104 and the second scanner 106 being connected to the scanning platform 102 and controlled by the controller 124 provides a greater degree of accuracy as compared to independent metrology systems.

Figure 10:
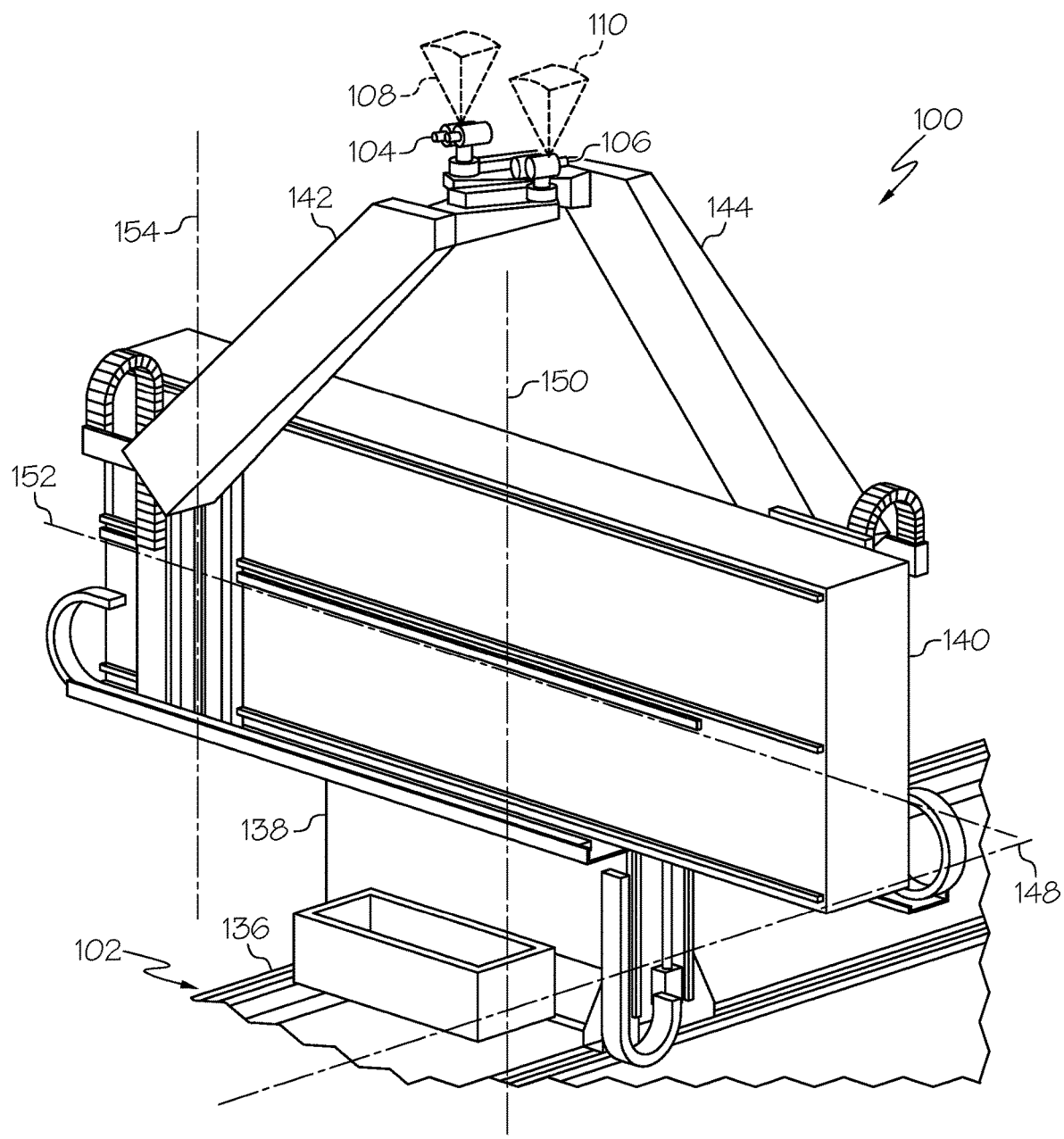
FIG. 10 is a schematic, perspective view of an example of a portion of the scanning apparatus of FIG. 1.
Figure 11:
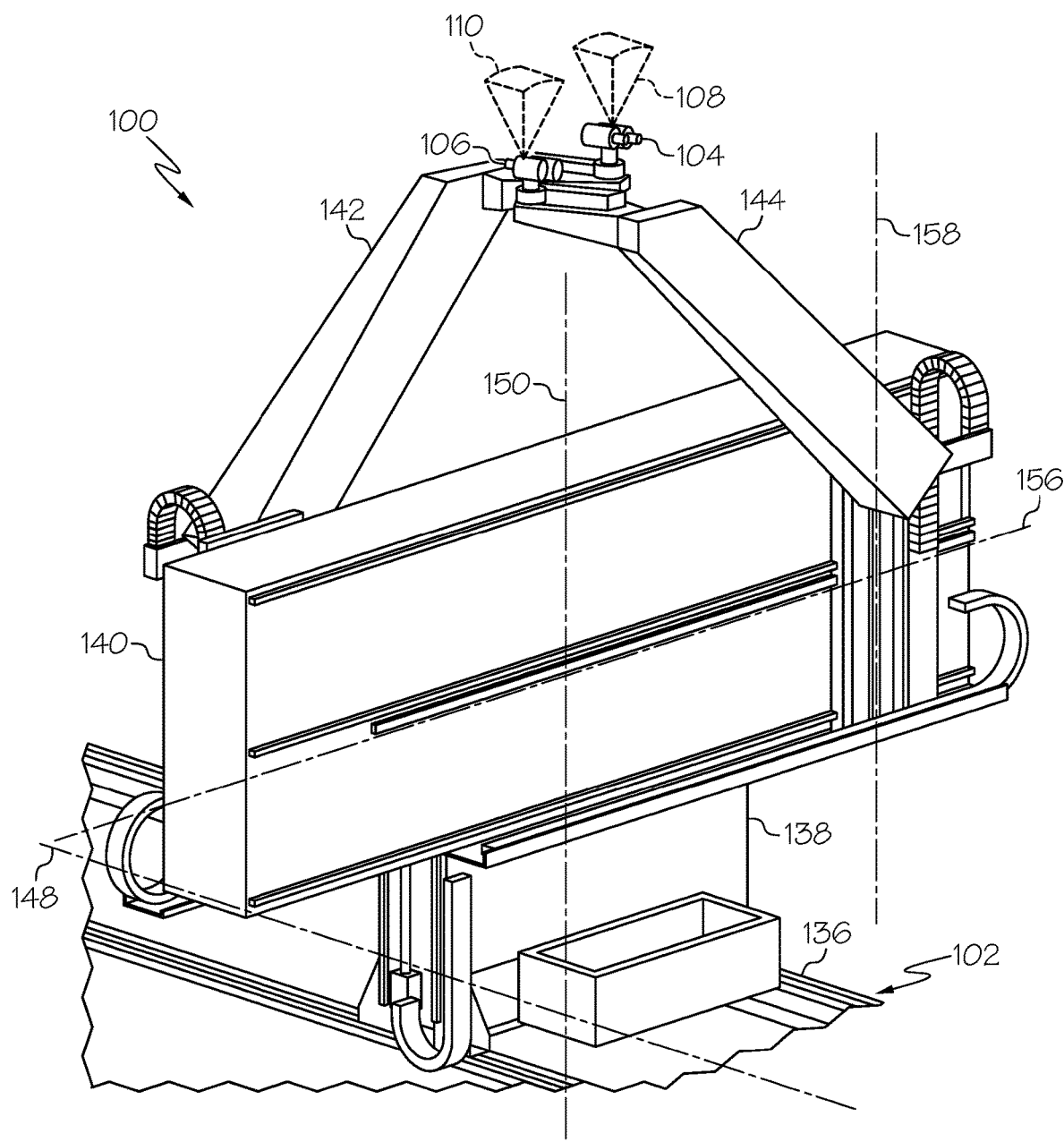
FIG. 11 is a schematic, perspective view of an example of a portion of the scanning apparatus of FIG. 1.

In some of the illustrative examples, the X-axis, the Y-axis, and the Z-axis, along which the first scanner 104 and the second scanner 106 move, are aligned with the orthogonal axes of the fixed coordinate system 188. For the purpose of the present disclosure, aligned axes refer to axes that are one or parallel to or coincident with each other. In such examples, during the scanning operation, the part 200 is oriented horizontally and the XY-plane of the fixed coordinate system 188 of the scanning apparatus 100 is horizontal. However, the present disclosure recognizes that, in some examples, the part 200 has a non-horizontal orientation (e.g., vertical or oblique to a horizontal plane). As such, in one or more examples, the scanning apparatus 100 is not limited to the illustrated XYZ-coordinate system and, for example, is set up in a non-horizontal orientation during the scanning operation. FIGS. 10 and 11 illustrate examples of the scanning apparatus 100 that are not bound to a particular coordinate system.

Referring to FIGS. 10 and 11, in one or more examples of the disclosed the scanning apparatus 100, the carriage 138 is coupled to the base 136 and is movable relative to the base 136 along a first axis of linear movement 148. The support beam 140 is coupled to the carriage 138 and is movable relative to the carriage 138 along a second axis of linear movement 150. The second axis of linear movement 150 is perpendicular to the first axis of linear movement 148.

The first arm 142 is movable relative to the support beam 140 along a third axis of linear movement 152 and along a fourth axis of linear movement 154. The third axis of linear movement 152 is perpendicular to the first axis of linear movement 148 and is perpendicular to the second axis of linear movement 150. The fourth axis of linear movement 154 is parallel to the second axis of linear movement 150.

The second arm 144 is movable relative to the support beam 140 along a fifth axis of linear movement 156 and along a sixth axis of linear movement 156. The fifth axis of linear movement 156 is perpendicular to the first axis of linear movement 148 and is perpendicular to the second axis of linear movement 150. The sixth axis of linear movement 158 is parallel to the second axis of linear movement 150.

The first field of view 108 of the first scanner 104 and the second field of view 110 of the second scanner 106 at least partially overlap when the first arm 142 moves along the third axis of linear movement 152 and the second arm 144 moves along the fifth axis of linear movement 156.

In one example, the first scanner 104 and the second scanner 106 are independently movable relative to the part 200. While moving the first arm 142 along the third axis of linear movement 152, the first scanner 104 is configured to scan the first portion 204 of the part 200 and acquire the first scan-data 112. While moving the second arm 144 along the fifth axis of linear movement 156, the second scanner 106 is configured to scan the second portion 206 of the part 200 and acquire the second scan-data 114. The first portion 204 of the part 200 and the second portion 206 of the part 200 at least partially overlap so that at least one structural feature 216 of the part 200 is represented by both the first scan-data 112 and the second scan-data 114.

Referring generally to FIGS. 12-27, by way of examples, the present disclosure also describes a method 1000 of scanning the part 200 for predictive shimming. For example, the method 1000 is used for, or forms a portion of, a predictive shimming operation. The method 1000 is implemented using the scanning apparatus 100 (FIGS. 1-3, 7-11, 14, 18, 22, 26, and 27) to scan at least a portion of the part 200 (FIGS. 1, 5-7, 14, 18, 22, 26, and 27).

Figure 12:
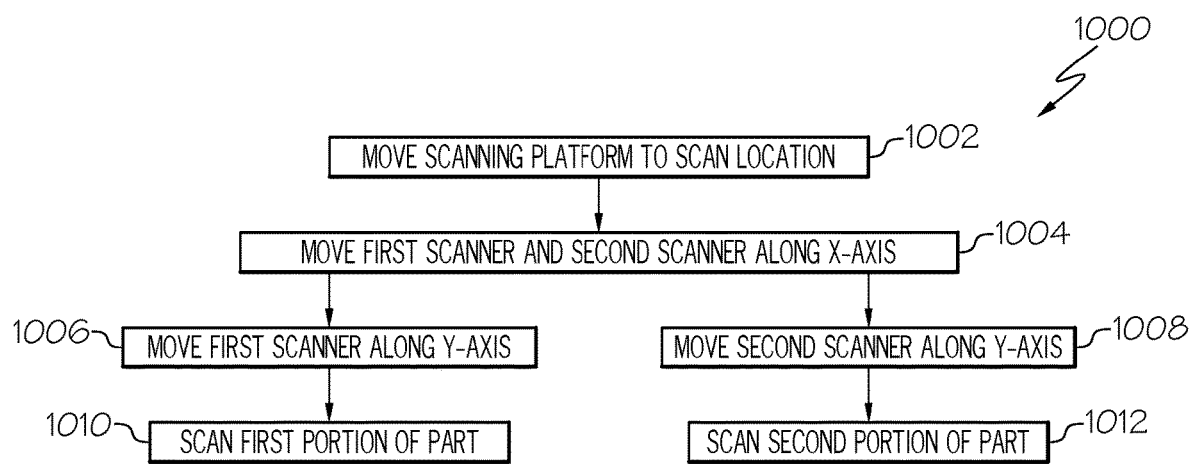
FIG. 12 is a flow diagram of an example of a portion of method of scanning utilizing the scanning apparatus of FIG. 1.
Figure 14:
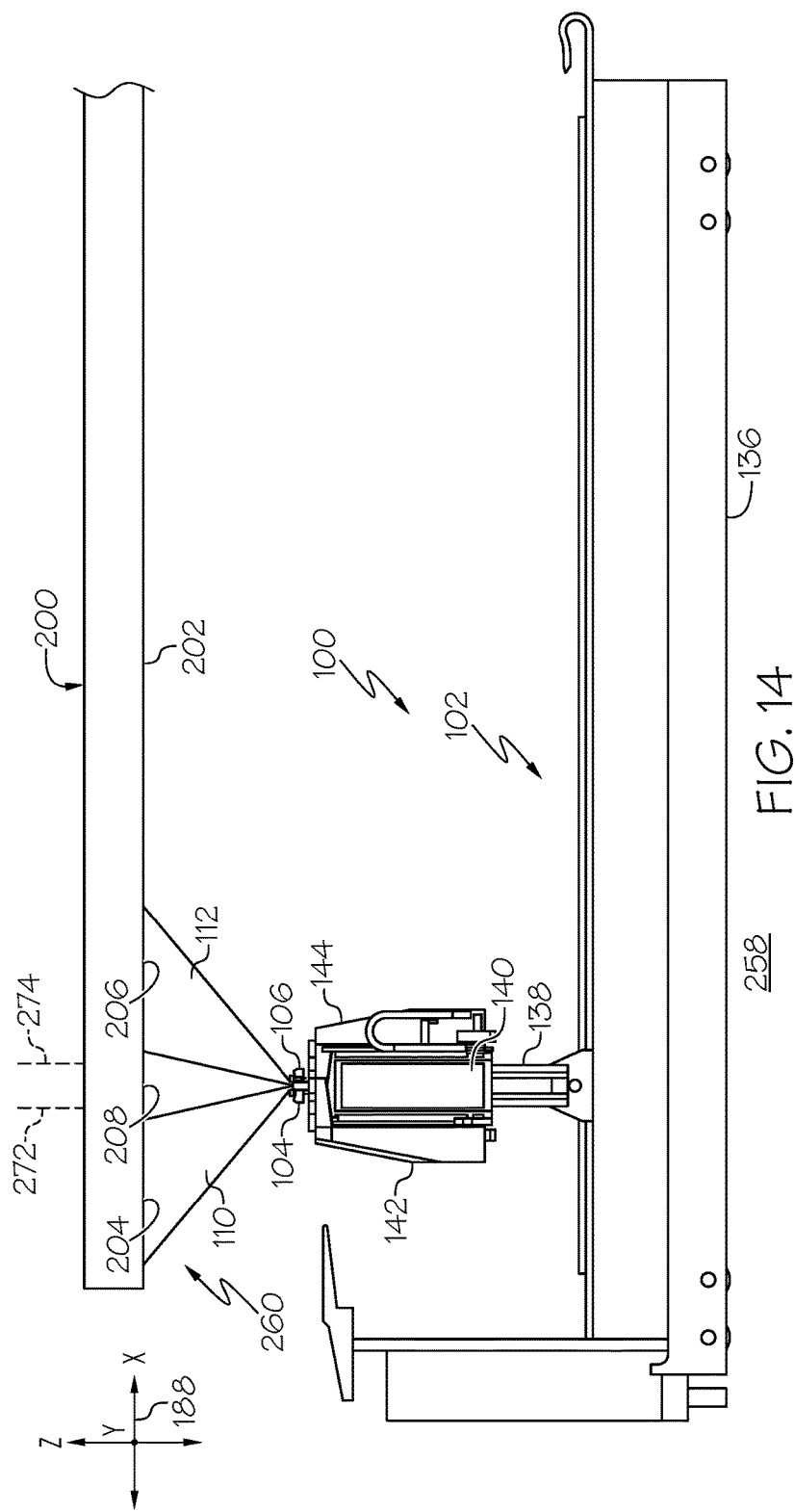
FIG. 14 is a schematic illustration of an example of the scanning apparatus of FIG. 1 during the portion of the method of FIG. 12.

Referring to FIGS. 12 and 14, the method 1000 includes a step of (block 1002) moving the scanning platform 102 to a scan location 258 relative to the part 200. For example, the scanning platform 102 is moved to the scan location 258 underneath the part 200, as illustrated in FIG. 14. Moving the scanning platform 102 also moves the connected first scanner 104 and the second scanner 106 relative to the part 200.

In an example, the scan location 258 (FIG. 12) is one of the plurality of scan locations 192 (FIG. 6). For example, the scan location 258 is a first scan location. In one or more examples, the first scan location 258 locates the scanning apparatus 100 proximate to one of the first part-end 226 (FIG. 6) or the second part-end 228 (FIG. 6) of the part 200.

The method 1000 includes a step of (block 1004), with the scanning platform 102 at the scan location 258, moving the first scanner 104 and the second scanner 106 along the X-axis relative the part 200. In an example, the first scanner 104 and the second scanner 106 are moved together along the X-axis by moving the carriage 138 along the X-axis relative to the base 136 (FIG. 14). For example, moving the carriage 138 along the X-axis relative to the base 136 positions the first scanner 104 at a first X-location 272 (FIG. 14) and positions the second scanner 106 at a second X-location 274 (FIG. 14). The first X-location 272 and the second X-location 274 are different.

In an example implementation of the method 1000 used with the frame 1222 of the wing 1220 (FIGS. 5 and 6), moving the first scanner 104 and the second scanner 106 together along the X-axis advantageously enables spars of the frame 1222 to be scanned by the first scanner 104 and the second scanner 106 and a single rib of the frame 1222 to be scanned by the first scanner 104 and the second scanner 106, simultaneously. In an example, the rib of the frame 1222 is in the overlap 208 formed by the first portion 204, scanned by the first scanner 104, and the second portion 206, scanned by the second scanner 106. For example, the rib or a portion of the rib (e.g., an edge of the rib) is the structural feature 216 (FIG. 1) used to align data subsets of the scan data 184 (FIG. 1).

The method 1000 includes a step of, with the scanning platform 102 at the scan location 258, moving the first scanner 104 and the second scanner 106 along the Z-axis relative the part 200. In an example, the first scanner 104 and the second scanner 106 are moved together along the Z-axis by moving the support beam 140 along the Z-axis relative to the carriage 138 (FIG. 14). For example, moving the support beam 140 along the Z-axis relative to the carriage 138 positions the first scanner 104 at a first Z-location and positions the second scanner 106 at a second Z-location. In one or more examples, the first Z-location and the second Z-location are the same or are different.

The method 1000 includes a step of (block 1006), with the first scanner 104 at the first X-location 272, moving the first scanner 104 along the Y-axis relative to the part 200. The method 1000 also includes a step of (block 1008), with the second scanner 106 at the second X-location 274, moving the second scanner 106 along the Y-axis relative to the part 200.

In an example, the first scanner 104 is coupled to the first arm 142 and the second scanner 106 is coupled to the second arm 144. The step of (block 1006) moving the first scanner 104 includes a step of moving the first arm 142 along the Y-axis relative to the support beam 140 of the scanning platform 102. The step of (block 1008) moving the second scanner 106 includes a step of moving the second arm 144 along the Y-axis relative to the support beam 140. The first arm 142 and the second arm 144 move along the Y-axis independent of and relative to each other.

The method 1000 includes a step of (block 1010), while moving the first scanner 104 along the Y-axis, scanning the first portion 204 (FIG. 14) of the part 200 to form (e.g., generate or acquire) the first scan-data 112 (FIG. 15) for predictive shimming. The method 1000 also includes a step of (block 1012), while moving the second scanner 106 along the Y-axis, scanning the second portion 206 (FIG. 14) of the part 200 to form (e.g., generate or acquire) the second scan-data 114 for predictive shimming.

As illustrated in FIG. 14, the first portion 204 of the part 200, scanned by the first scanner 104, and the second portion 206 of the part 200, scanned by the second scanner 106, partially overlap each other. The first subset 120 (FIG. 15) of the first scan-data 112 and the second subset 122 of the second scan-data 114 represent the overlap 208 (FIG. 14) of the first portion 204 and the second portion 206.

In an example, the method 1000 also includes a step of moving the first scanner 104 along the Z-axis relative to the part 200 and moving the second scanner 106 along the Z-axis relative to the part 200. The step of moving the first scanner 104 includes a step of moving the first arm 142 along the Z-axis relative to the support beam. The step of moving the second scanner 106 includes a step of moving the second arm 144 along the Z-axis relative to the support beam 140. The first arm 142 and the second arm 144 move along the Z-axis independent of and relative to each other. In an example, the step of moving the first scanner 104 along the Z-axis is performed while moving the first scanner 104 along the Y-axis (block 1006). In an example, the step of moving the second scanner 106 along the Z-axis is performed while moving the second scanner 106 along the Y-axis (block 1008).

Moving the first scanner 104 and the second scanner 106 along the Z-axis (e.g., by moving the support beam 140 relative to the carriage 138 and/or by moving the respective first arm 142 and second arm 144 relative to the support beam 140) selectively locates the first scanner 104 and the second scanner 106 relative to the part 200. For example, selective control of the first scanner 104 along the Z-axis maintains a consistent offset between the first scanner 104 and the surface 202 of the part 200, during the scanning operation (e.g., while moving the first scanner 104 along the Y-axis). Similarly, selective control of the second scanner 106 along the Z-axis maintains a consistent offset between the second scanner 106 and the surface 202 of the part 200, during the scanning operation (e.g., while moving the second scanner 106 along the Y-axis). Maintaining a consistent and accurate offset advantageously increases the accuracy of the scan data 184 (FIG. 1), representing the part 200.

In an example, the scanning platform 102 operates under numerical control programming (e.g., via the controller 124) to control the Z-location of the first scanner 104 and the second scanner 106 an maintain a consistent offset from the part 200 based on the known location of the part 200 and the known location of the first scanner 104 and the second scanner 106 (e.g., determined using the location data 186 during the scanning operation). Accordingly, the scan data 184, representing the surface 202 of the part 200, and the location data 186, representing the precise location of the first scanner 104 and the second scanner 106, are used to generate an accurate three-dimensional representation of the part 200.

Figure 13:
FIG. 13 is a flow diagram of an example of a portion of the method of scanning utilizing the scanning apparatus of FIG. 1.
Figure 15:
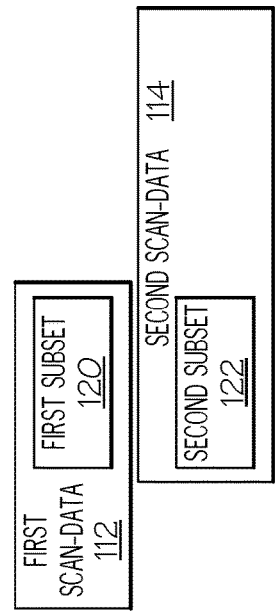
FIG. 15 is a schematic illustration of the portion of the method of FIG. 13.

Referring to FIGS. 13 and 15, in an example, the method 1000 includes a step of (block 1014) registering the second scan-data 114 to the first scan-data 112 by aligning the second subset 122 of the second scan-data 114 with the first subset 120 of the first scan-data 112.

The registering step (block 1014) is performed using any suitable spatial (e.g., point cloud) transformation operation that aligns two sets of data points, such as by merging multiple data sets into a globally consistent model. For example, the first scan-data 112 and the second scan-data 114 undergo a conditioning step in which a common feature (e.g., the structural feature 216 (FIG. 1)) is extracted from both sets of the scan data. Once both subsets of extracted data are available, the scan data goes thru the transformation processes in which the data sets are combined using a combination of waited best fit and point cloud merging. In an example, the method 1000 includes a step of generating the model 130 (FIG. 1) of the part 200 using the first scan-data 112 and the second scan-data 114.

In one or more example, following the operations illustrated in FIGS. 12 and 14, the method 1000 includes sequentially moving the first scanner 104 and the second scanner 106 further along the X-axis relative the part 200, such as along a portion of the length L (FIG. 6) of the part 200 to locate the first scanner 104 and the second scanner 106 at a plurality of corresponding subsequent X-locations. While at each one of the corresponding subsequent X-locations, the first scanner 104 and the second scanner 106 scan corresponding subsequent portions of the part 200 to form subsequent scan data.

Figure 16:
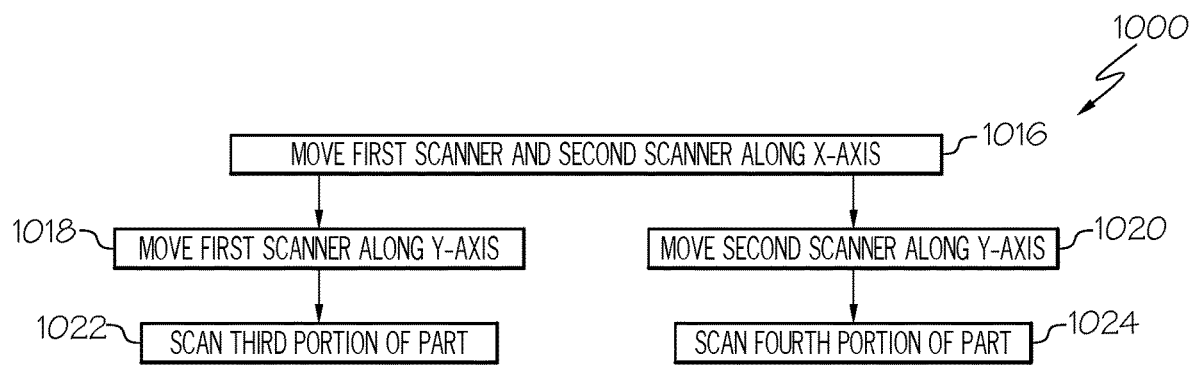
FIG. 16 is a flow diagram of an example of a portion of method of scanning utilizing the scanning apparatus of FIG. 1.
Figure 18:
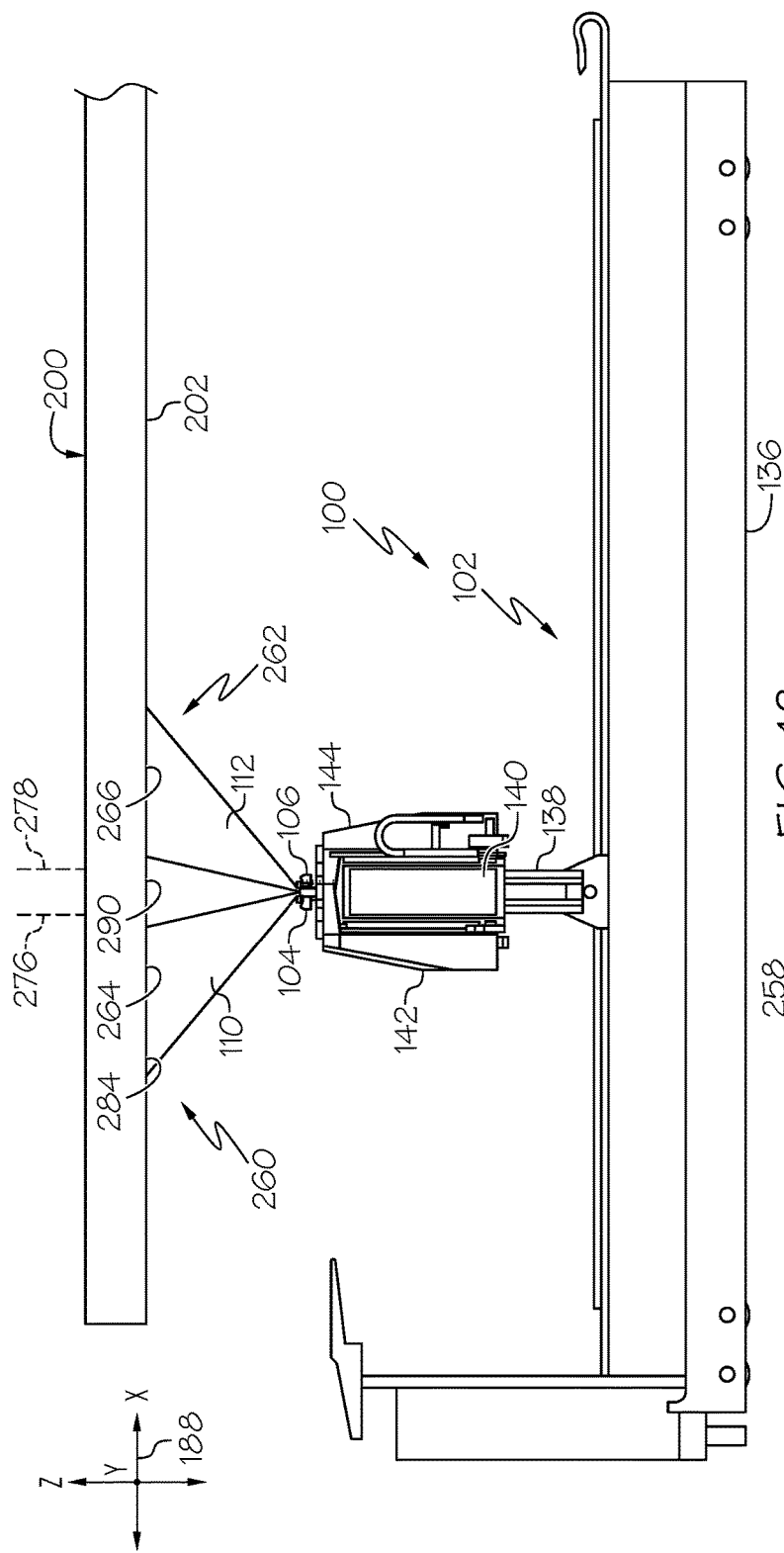
FIG. 18 is a schematic illustration of an example of the scanning apparatus of FIG. 1 during the portion of the method of FIG. 16.

Referring to FIGS. 16 and 18, in an example, the method 1000 includes a step of (block 1016), with the scanning platform 102 at the scan location 258 (FIG. 18), moving the first scanner 104 and the second scanner 106 along the X-axis relative the part 200. In an example, the first scanner 104 and the second scanner 106 are moved together further along the X-axis by moving the carriage 138 along the X-axis relative to the base 136 (FIG. 18). For example, moving the carriage 138 along the X-axis relative to the base 136 positions the first scanner 104 at a third X-location 276 (FIG. 18) and positions the second scanner 106 at a fourth X-location 278 (FIG. 18). The third X-location 276 and the fourth X-location 278 are different.

The method 1000 includes a step of (block 1018), with the first scanner 104 at the third X-location 276, moving the first scanner 104 along the Y-axis relative to the part 200. The method 1000 also includes a step of (block 1020), with the second scanner 106 at a fourth X-location 278, moving the second scanner 106 along the Y-axis relative to the part 200.

In an example, the method 1000 also includes a step of moving the first scanner 104 along the Z-axis relative to the part 200 and moving the second scanner 106 along the Z-axis relative to the part 200.

Figure 19:
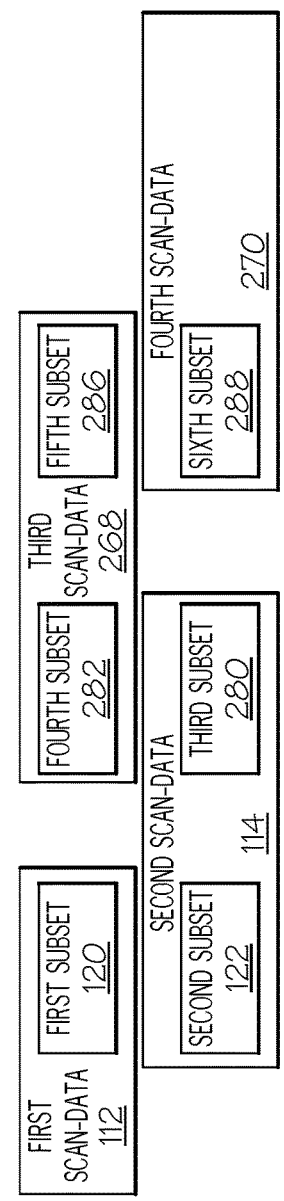
FIG. 19 is a schematic illustration of the portion of the method of FIG. 17.

The method 1000 includes a step of (block 1022), while moving the first scanner 104 along the Y-axis, scanning a third portion 264 (FIG. 18) of the part 200 to form third scan-data 268 (FIG. 19). The method 1000 also includes a step of (block 1024), while moving the second scanner 106, scanning a fourth portion 266 (FIG. 18) of the part 200 to form fourth scan-data 270 (FIG. 19).

As illustrated in FIG. 14, in an example, the first portion 204 of the part 200 and the second portion 206 of the part 200 form a first section 260 of the part 200. As illustrated in FIG. 18, in an example, the third portion 264 of the part 200 and the fourth portion 266 of the part 200 form a second section 262 of the part 200 that is directly adjacent to the first section 260 of the part 200. The second portion 206 (FIG. 14) of the part 200, scanned by the second scanner 106, and the third portion 264 (FIG. 18) of the part 200, scanned by the first scanner 104, partially overlap each other. A third subset 280 (FIG. 19) of the second scan-data 114 and a fourth subset 282 (FIG. 19) of the third scan-data 268 represent a second overlap 284 (FIG. 18) of the second portion 206 and the third portion 264. The third portion 264 of the part 200, scanned by the first scanner 104, and the fourth portion 266 of the part 200, scanned by the second scanner 106, partially overlap each other. A fifth subset 286 (FIG. 19) of the third scan-data 268 and a sixth subset 288 (FIG. 19) of the fourth scan-data 270 represent a third overlap 290 (FIG. 18) of the third portion 264 and the fourth portion 266.

Figure 17:
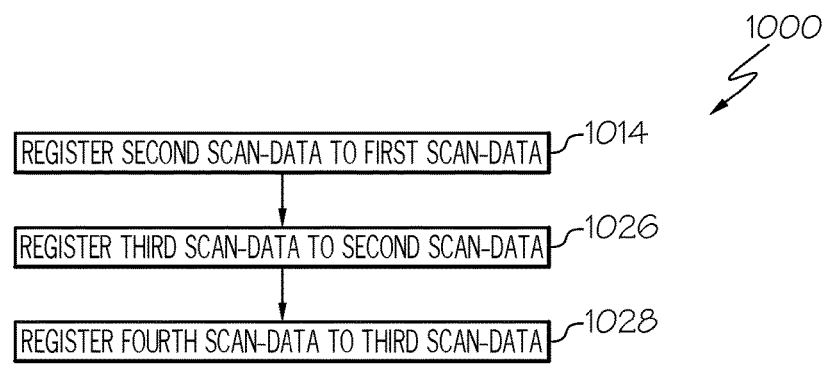
FIG. 17 is a flow diagram of an example of a portion of the method of scanning utilizing the scanning apparatus of FIG. 1.

Referring to FIGS. 17 and 19, in an example, the method 1000 includes a step of (block 1026) registering the third scan-data 268 to the second scan-data 114 by aligning the fourth subset 282 of the third scan-data 268 with the third subset 280 of the second scan-data 114. The method 1000 also includes a step of (block 1028) registering the fourth scan-data 270 to the third scan-data 268 by aligning the sixth subset 288 of the fourth scan-data 270 with the fifth subset 286 of the third scan-data 268.

The registering steps (blocks 1026 and 1028) are performed using any suitable spatial (e.g., point cloud) transformation operation that aligns two sets of data points, such as by merging multiple data sets into a globally consistent model. For example, the first scan-data 112, the second scan-data 114, the third scan-data 268, and the fourth scan-data 270 undergo a conditioning step in which common features (e.g., the structural feature 216 (FIG. 1)) are extracted from the sets of the scan data. Once the subsets of extracted data are available, the scan data goes thru the transformation processes in which the data sets are combined using a combination of waited best fit and point cloud merging. In an example, the method 1000 includes a step of generating the model 130 (FIG. 1) of the part 200 using the first scan-data 112, the second scan-data 114, the third scan-data 268, and the fourth scan-data 270.

In one or more examples, the operations illustrated in FIGS. 16 and 18 are sequentially repeated at a plurality of X-locations by moving the carriage 138 along the length of the base 136 to scan a plurality of subsequent sections of the part 200 along a portion of the length L (FIG. 6) of the part 200. After a portion of the length L of the part 200 corresponding to the length of the base 136 has been sequentially scanned, the scanning platform 102 is moved to another scan location along the length L of the part 200 and the operations illustrated in FIGS. 12, 14, 16, and 18 are repeated to scan a subsequent portion of the length L of the part 200.

Figure 20:
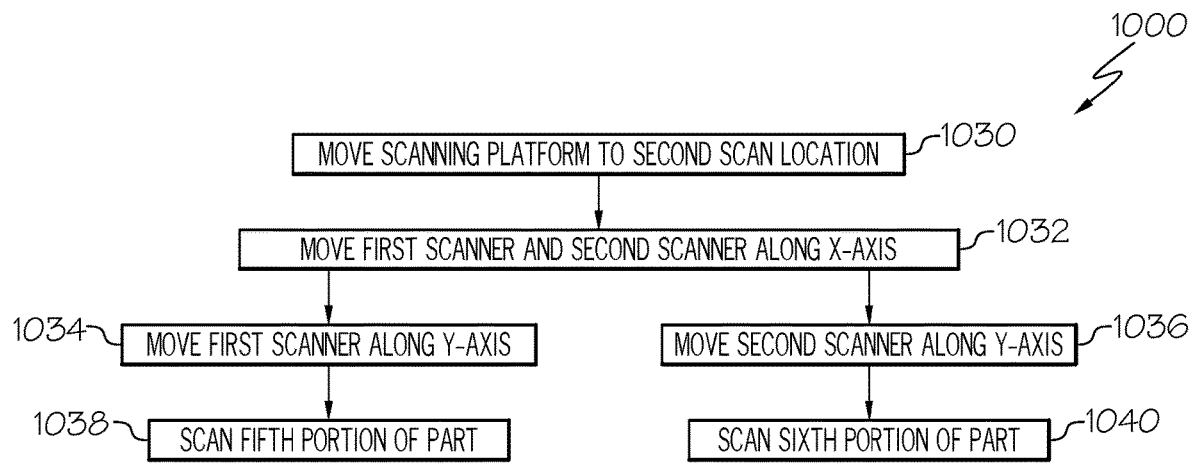
FIG. 20 is a flow diagram of an example of a portion of method of scanning utilizing the scanning apparatus of FIG. 1.
Figure 22:
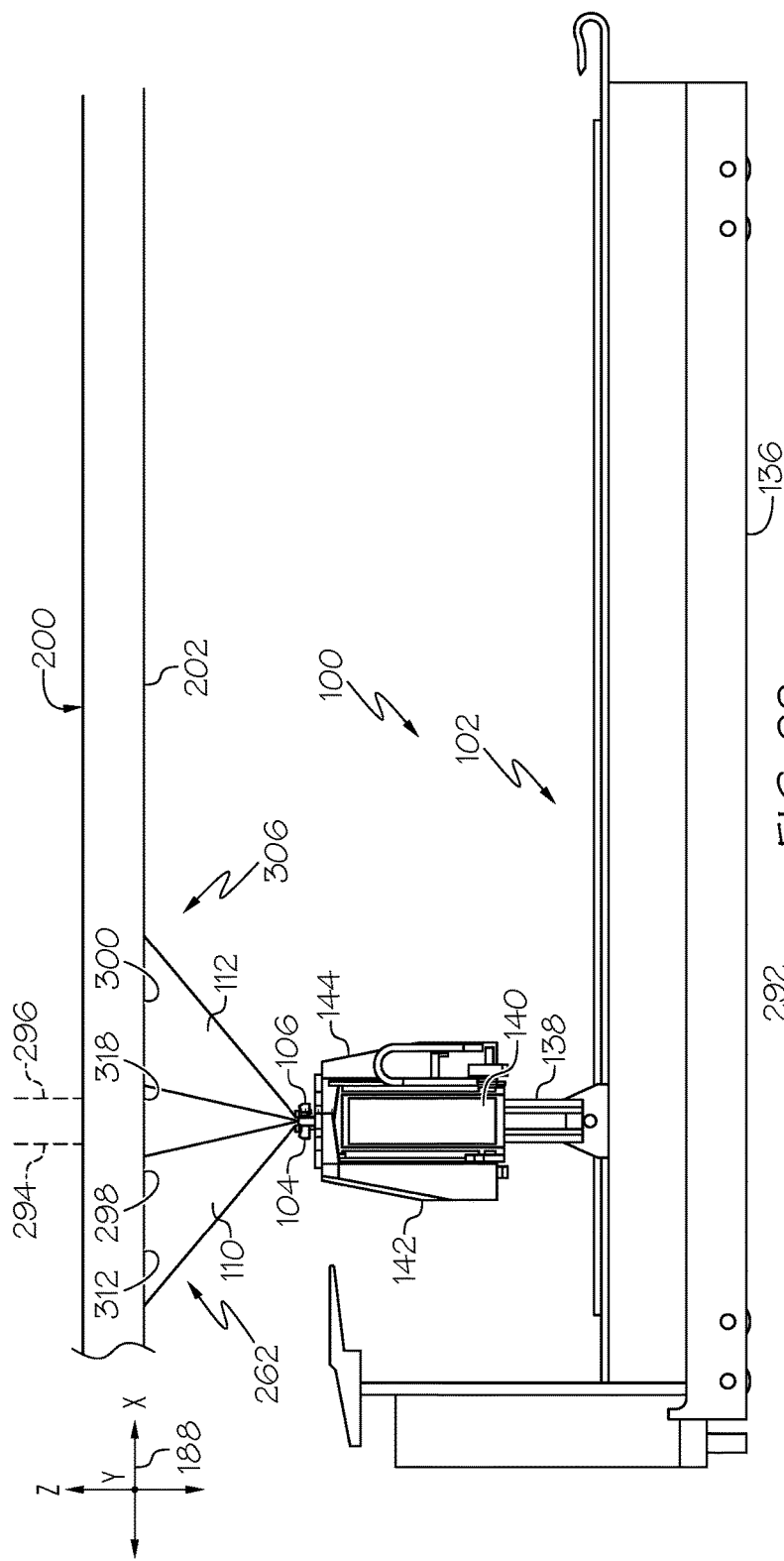
FIG. 22 is a schematic illustration of an example of the scanning apparatus of FIG. 1 during the portion of the method of FIG. 20.

Referring to FIGS. 20 and 22, in an example, the method 1000 includes a step of (block 1030) moving the scanning platform 102 to a second scan location 292 (FIG. 22) relative to the part 200. In an example, the second scan location 292 is one of the plurality of scan locations 192 (FIG. 6).

In an example, the method 1000 includes a step of (block 1032), with the scanning platform 102 at the second scan location 292, moving the first scanner 104 and the second scanner 106 along the X-axis relative the part 200. In an example, the first scanner 104 and the second scanner 106 are moved together along the X-axis by moving the carriage 138 along the X-axis relative to the base 136 (FIG. 22). For example, moving the carriage 138 along the X-axis relative to the base 136 positions the first scanner 104 at a fifth X-location 294 (FIG. 22) and positions the second scanner 106 at a sixth X-location 296 (FIG. 22). The fifth X-location 294 and the sixth X-location 296 are different.

The method 1000 includes a step of (block 1034), with the first scanner 104 at the fifth X-location 294, moving the first scanner 104 along the Y-axis relative to the part 200. The method 1000 also includes a step of (block 1036), with the second scanner 106 at the sixth X-location 296, moving the second scanner 106 along the Y-axis relative to the section of the part 200.

In an example, the method 1000 also includes a step of moving the first scanner 104 along the Z-axis relative to the part 200 and moving the second scanner 106 along the Z-axis relative to the part 200.

Figure 23:
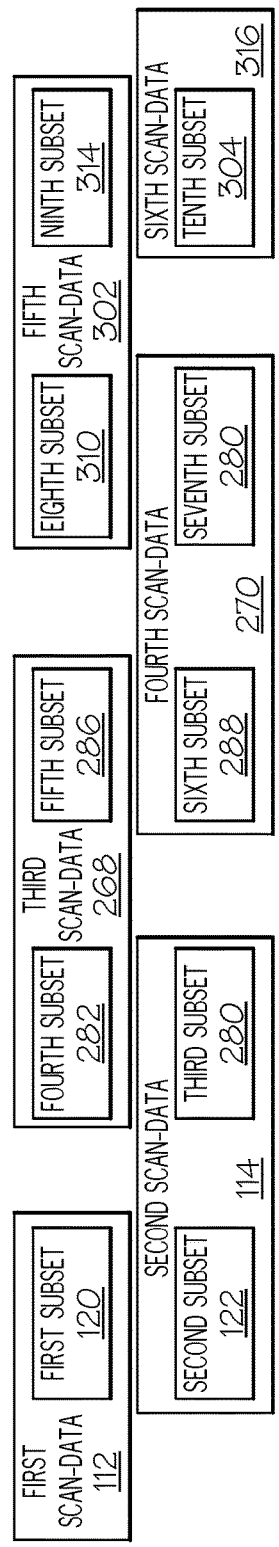
FIG. 23 is a schematic illustration of the portion of the method of FIG. 21.

The method 1000 includes a step of (block 1038), while moving the first scanner 104, scanning a fifth portion 298 (FIG. 22) of the part 200 to acquire fifth scan-data 302 (FIG. 23). The method 1000 also includes a step of (block 1040), while moving the second scanner 106, scanning a sixth portion 300 (FIG. 22) of the part 200 to acquire sixth scan-data 304 (FIG. 23).

As illustrated in FIG. 22, in an example, the fifth portion 298 of the part 200 and the sixth portion 300 of the part 200 form a third section 306 of the part 200 that is directly adjacent to the second section 262 of the part 200. The fourth portion 266 (FIG. 18) of the part 200, scanned by the second scanner 106, and the fifth portion 298 of the part 200, scanned by the first scanner 104, partially overlap each other. A seventh subset 308 (FIG. 23) of the fourth scan-data 270 and an eighth subset 310 (FIG. 23) of the fifth scan-data 302 represent a fourth overlap 312 (FIG. 22) of the fourth portion 266 and the fifth portion 298. The fifth portion 298 of the part 200, scanned by the first scanner 104, and the sixth portion 300 of the part 200, scanned by the second scanner 106, partially overlap each other. A ninth subset 314 (FIG. 23) of the fifth scan-data 302 and a tenth subset 316 (FIG. 23) of the sixth scan-data 304 represent a fifth overlap 318 of the fifth portion 298 and the sixth portion 300.

Figure 21:
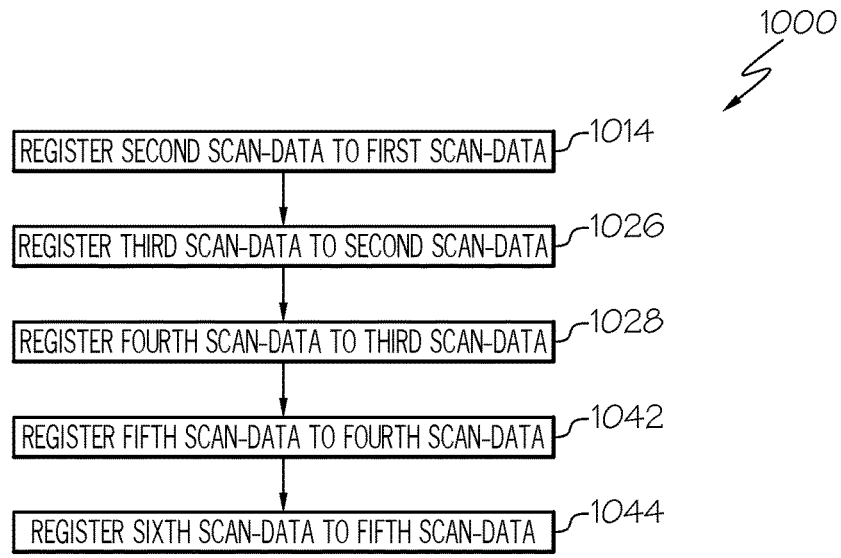
FIG. 21 is a flow diagram of an example of a portion of the method of scanning utilizing the scanning apparatus of FIG. 1.

Referring to FIGS. 21 and 23, in an example, the method 1000 includes a step of (block 1042) registering the fifth scan-data 302 to the fourth scan-data 270 by aligning the eighth subset 310 of the fifth scan-data 302 with the seventh subset 308 of the fourth scan-data 270. The method 1000 also includes a step of (block 1044) registering the sixth scan-data 304 to the fifth scan-data 302 by aligning the tenth subset 316 of the sixth scan-data 304 with the ninth subset 314 of the fifth scan-data 302.

The registering steps (blocks 1042 and 1044) are performed using any suitable spatial (e.g., point cloud) transformation operation that aligns two sets of data points, such as by merging multiple data sets into a globally consistent model. For example, the first scan-data 112, the second scan-data 114, the third scan-data 268, the fourth scan-data 270, the fifth scan-data 302, and the sixth scan-data 304 undergo a conditioning step in which common features (e.g., the structural feature 216 (FIG. 1)) are extracted from the sets of the scan data. Once the subsets of extracted data are available, the scan data goes thru the transformation processes in which the data sets are combined using a combination of waited best fit and point cloud merging. In an example, the method 1000 includes a step of generating the model 130 (FIG. 1) of the part 200 using the first scan-data 112, the second scan-data 114, the third scan-data 268, the fourth scan-data 270, the fifth scan-data 302, and the sixth scan-data 304.

In one or more examples, the operations illustrated in FIGS. 12-23 are sequentially repeated at a plurality of subsequent X-locations along the length L (FIG. 6) of the part 200 to form scan data 184 (FIG. 1) that represents the entire part 200 along the length L and the width W (FIG. 6) of the part 200. It should be appreciated that, in some examples, more than two sections of the part 200 are scanned at a given one of the plurality of scan locations 192 (FIG. 6) of the scanning platform 102 before moving the scanning platform 102 to a subsequent one of the plurality of scan locations 192 along the length L of the part 200. Each section of the part 200 that is scanned overlaps with a directly adjacent section of the part 200 so that subsets of the scan data capable of being aligned during registration of the scan data.

In one or more examples, moving the first scanner 104 and the second scanner 106 along the X-axis, in turn moves the first scanner 104 and the second scanner 106 to corresponding X-locations along the length L of the part 200. At the corresponding X-locations, the first scanner 104 and the second scanner 106 move along the Y-axis to scan at least a portion of the width W (FIG. 6) of the part 200. As illustrated in FIG. 6, in one or more examples, the maximum width of the part 200 (e.g., the frame 1222 of the wing 1220) is significantly larger than the minimum width of the part 200. The configuration and movement of the first arm 142 and the second arm 144 account for the significant difference between the maximum width and the minimum width of the part 200 without requiring movement of the scanning platform 102 to a different scan location.

Figure 24:
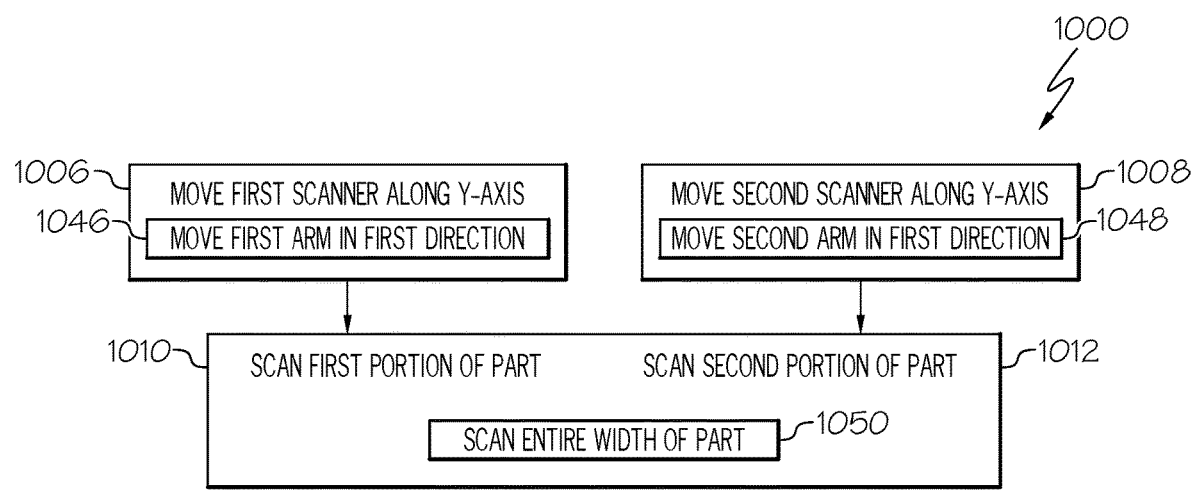
FIG. 24 is a flow diagram of an example of a portion of the method of scanning utilizing the scanning apparatus of FIG. 1.
Figure 26:
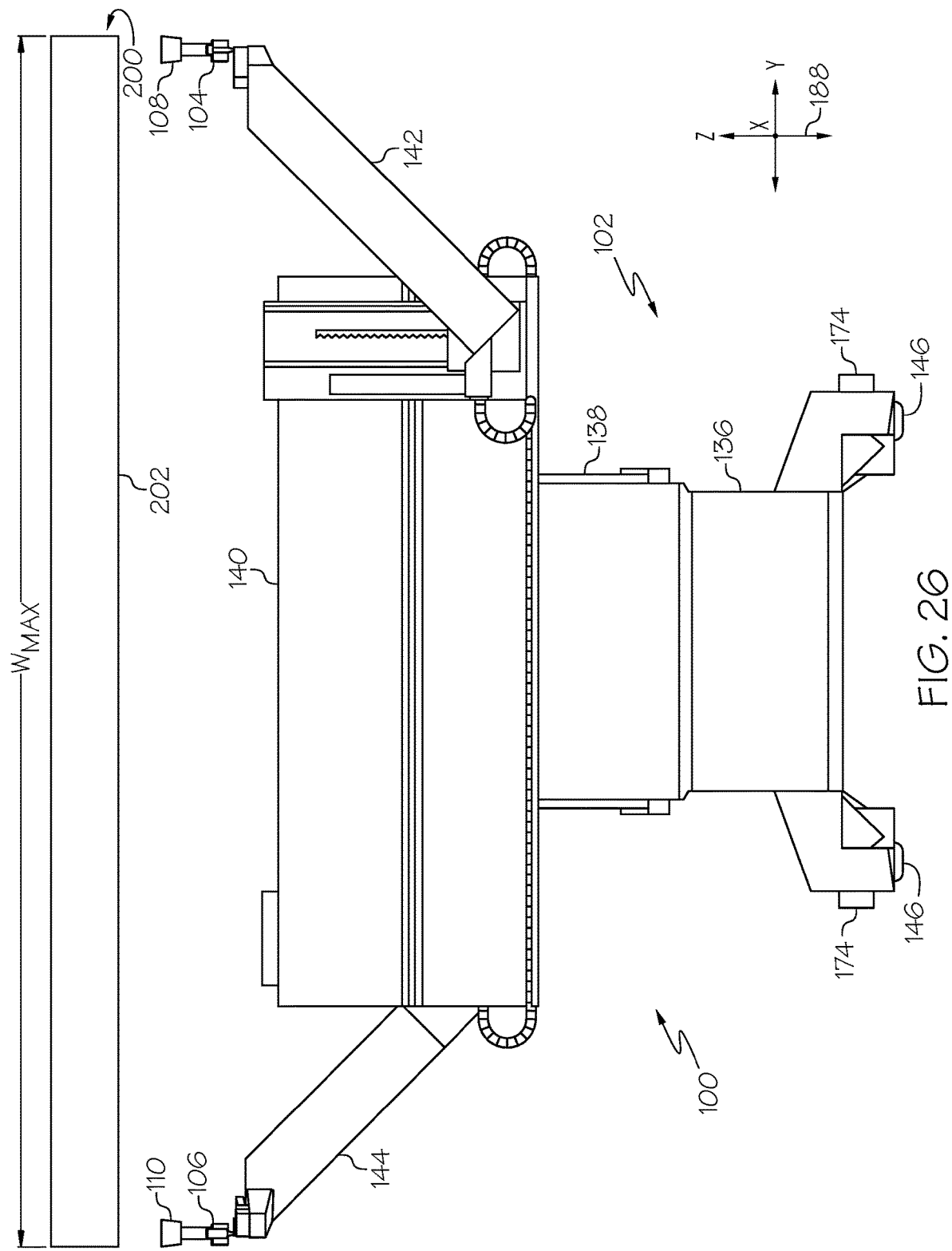
FIG. 26 is a schematic illustration of an example of the scanning apparatus of FIG. 1 during the portion of the method of FIG. 24.
Figure 27:
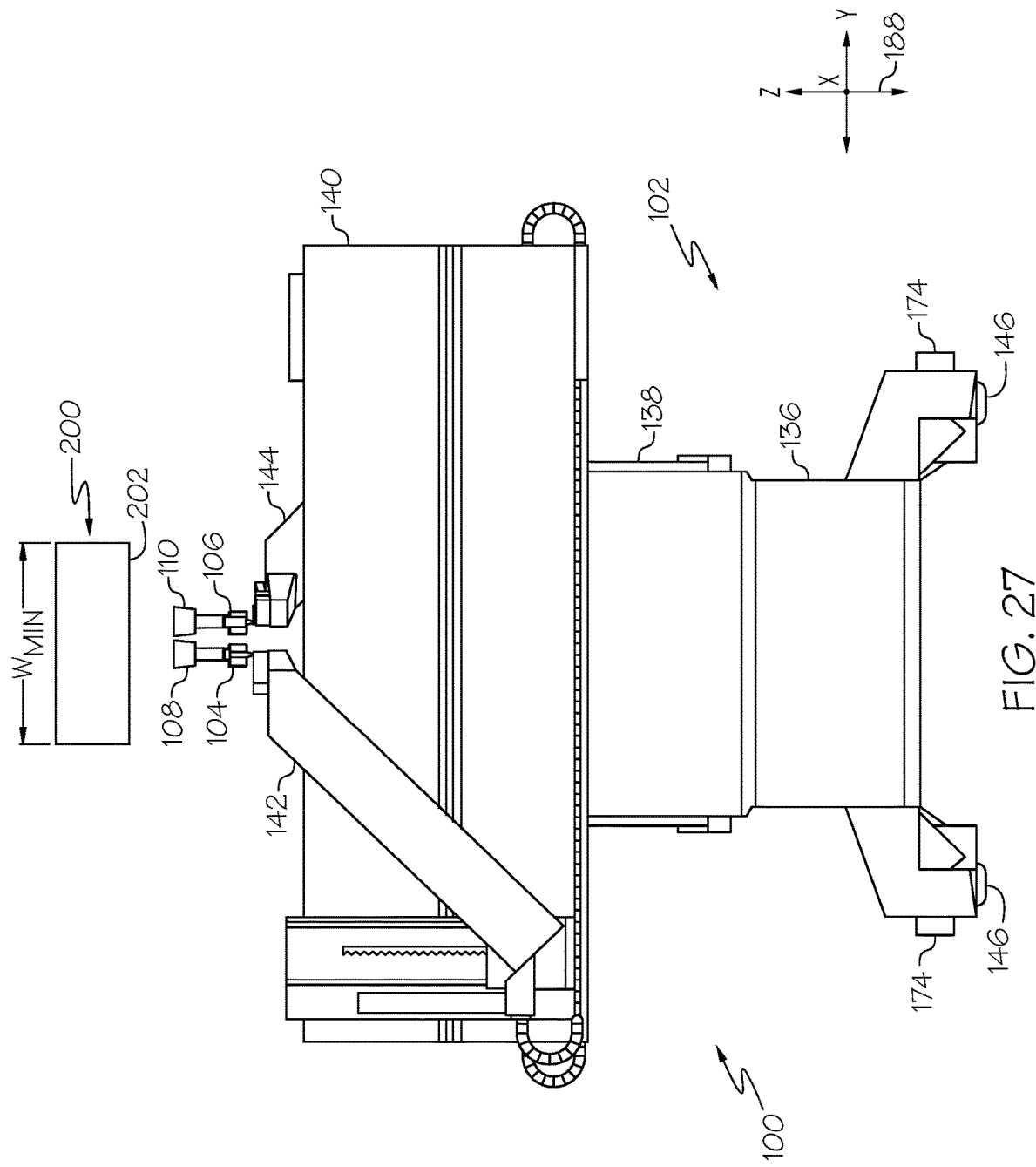
FIG. 27 is a schematic illustration of an example of the scanning apparatus of FIG. 1 during the portion of the method of FIG. 24.

Referring to FIGS. 24, 26, and 27, in an example, the first arm 142 and the second arm 144 extend in opposite directions along the Y-axis. Each one of the steps of (blocks 1006, 1018, and 1034) moving the first scanner 104 along the Y-axis include a step of (block 1046) moving the first arm 142 in a first direction along the Y-axis. Each one of the steps of (block 1008, 1020, and 1036) moving the second scanner 106 along the Y-axis includes a step of (block 1048) moving the second arm 144 in a second direction along the Y-axis. The first direction and the second direction are opposite to each other. The step of (block 1010) scanning the first portion 204 (FIG. 14) of the part 200 and the step of (block 1012) scanning the second portion 206 (FIG. 14) of the part 200 include a step of (block 1050) scanning an entire width of the part 200. Similarly, the step of (block 1022) scanning the third portion 264 (FIG. 18) of the part 200 and the step of (block 1024) scanning the fourth portion 266 (FIG. 18) of the part 200 includes the step of (block 1050) scanning the entire width of the part 200. Similarly, the step of (block 1038) scanning the fifth portion 298 (FIG. 22) of the part 200 and the step of (block 1040) scanning the sixth portion 300 (FIG. 22) of the part 200 includes the step of (block 1050) scanning the entire width of the part 200.

As illustrated in FIG. 26, moving the first arm 142 and the second arm 144 in opposite directions along the Y-axis enables the first scanner 104 and the second scanner 106 to be positioned proximate to opposing edges of the part 200 at the maximum width $W_{MAX}$ of the part 200 to scan the entire width W of the part 200 when moving along the Y-axis. As illustrated in FIG. 27, moving the first arm 142 and the second arm 144 in opposite directions along the Y-axis also enables the first scanner 104 and the second scanner 106 to be positioned proximate to opposing edges of the part 200 at the minimum width $W_{MIN}$ of the part 200 to scan the entire width W of the part 200 when moving along the Y-axis.

Figure 25:
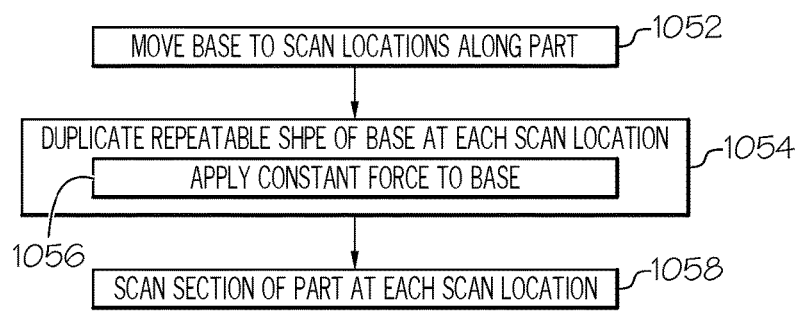
FIG. 25 is a flow diagram of an example of a portion of the method of scanning utilizing the scanning apparatus of FIG. 1.

Referring to FIGS. 7, 8, and 25, in an example, the method 1000 includes a step of (block 1052) moving the base 136 of the scanning platform 102 to the plurality of scan locations 192 (FIG. 6) relative to the part 200. In an example, the plurality of scan locations 192 is arranged along the X-axis. For example, the base 136 is moved to each one of the plurality of scan locations 192 along the length L (FIG. 6) of the part 200.

In an example, the method 1000 includes a step of (block 1054), at each one of the plurality of scan locations 192, duplicating the repeatable shape of the base 136. In an example, the step of (block 1054) duplicating the repeatable shape of the base 136 includes a step of (block 1056) applying the constant force F (FIG. 8) to the base 136 using the plurality of jacks 174 (FIG. 8), coupled to the base 136, so that the base 136 maintains the repeatable shape at each one of the plurality of scan locations 192.

In an example, the method 1000 includes a step of (block 1058) at each one of the plurality of scan locations 192, scanning a section of the part 200 using the first scanner 104 and the second scanner 106 to form the scan data 184, representing the part 200, for predictive shimming. In this example, the repeatable shape of the base 136 is duplicated and maintained at each one of the plurality of scan locations 192 while moving the first scanner 104 and the second scanner 106 along the X-axis, the Y-axis, and/or the Z-axis relative to the part 200.

Figure 28:
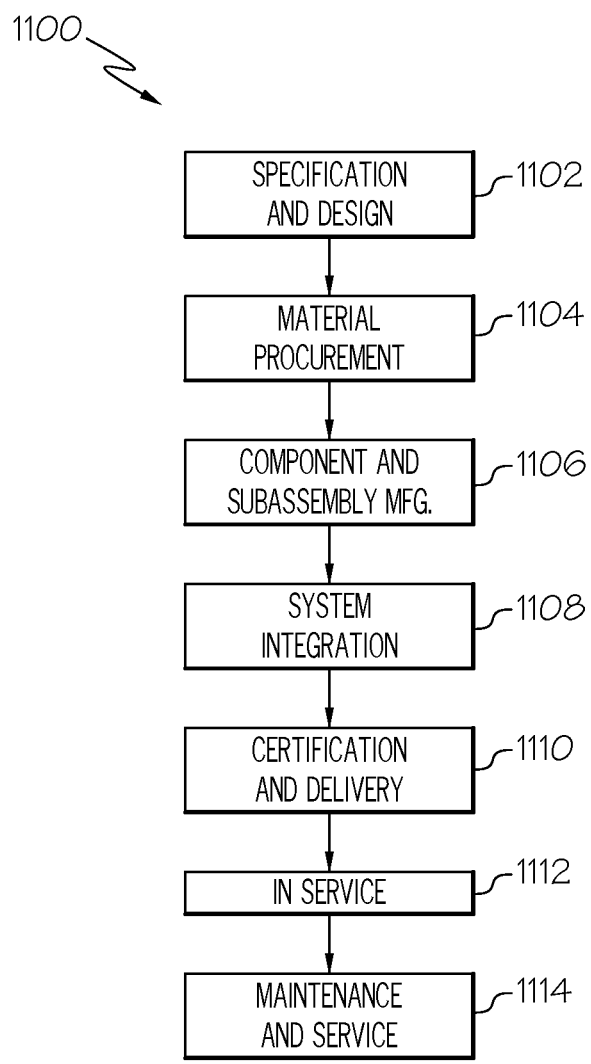
FIG. 28 is a flow diagram of an aircraft manufacturing and service methodology.

Referring now to FIGS. 4 and 28, examples of the scanning apparatus 100 and the method 1000 may be used in the context of an aircraft manufacturing and service method 1100, as shown in the flow diagram of FIG. 28 and the aircraft 1200, as schematically illustrated in FIG. 4.

Referring to FIG. 4, in an example, the aircraft 1200 includes an airframe 1202 and a plurality of high-level systems 1204. Examples of the high-level systems 1204 include one or more of a propulsion system 1208, an electrical system 1210, a hydraulic system 1212, and an environmental system 1214. In other examples, the aircraft 1200 includes any number of other types of systems, such as a communications system, a guidance system, and the like. The scanning apparatus 100 and the method 1000 may be employed in manufacture and/or assembly of at least one component of the aircraft 1200. For example, the scan data 184 is used to manufacture shims 222 (FIG. 5) to form a portion of the airframe 1202, the fuselage 1218, and/or the wing 1220.

As illustrated in FIG. 28, during pre-production, the method 1100 includes specification and design of the aircraft 1200 (block 1102) and material procurement (block 1104). During production of the aircraft 1200, the method 1100 includes component and subassembly manufacturing (block 1106) and system integration (block 1108). Thereafter, the method 1100 includes certification and delivery (block 1110) of the aircraft 1200 and the aircraft 1200 is placed in service (block 1112). Routine maintenance and service (block 1114)

includes modification, reconfiguration, refurbishment, etc. of one or more assemblies, components, and systems of the aircraft 1200.

Each of the processes of the method 1100 illustrated in FIG. 28 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

The examples of the scanning apparatus 100 and the method 1000 shown and described herein may be employed during any one or more of the stages of the manufacturing and service method 1100 shown in the flow diagram illustrated by FIG. 28. In an example, the scanning apparatus 100 and the method 1000 are used to scan the part 200 of the aircraft 1200 for predictive shimming during component and subassembly manufacturing (block 1106) and/or system integration (block 1108). In an example, the scanning apparatus 100 and the method 1000 are used to scan a replacement part for predictive shimming while the aircraft 1200 is in service (block 1112) and/or during maintenance and service (block 1114).

To reduce manufacturing cost and time, the disclosed scanning apparatus 100 and the method 1000 assist with the prediction of shims in aircraft parts. The examples of the scanning apparatus 100 and the method 1000 provide for efficient measurement and inspection of such parts and enable accurate scan data to be quickly acquired. Accordingly, also disclosed is a method of predicting gaps between the part 200 and the second part 220 of the aircraft 1200 (FIG. 4) and a method of fabricating shims 222 (FIG. 5) used during assembly of a portion of the aircraft 1200 using the scanning apparatus 100 (FIGS. 1-3 and 7-11) and/or the method 1000 (FIGS. 12-27).

While the illustrative examples are directed to apparatuses and methods for scanning a part for predictive shimming, the discloses scanning apparatus 100 and method 1000 are also applicable to any one of various other inspection or measurement applications.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, relative terms, such as "horizontal," "vertical," "parallel," "perpendicular," and the like, include a circumstance in which items are exactly the stated condition and a circumstance in which items are approximately the stated condition.

As used herein, the term "approximately" refers to a condition that is close to, but not exactly, the stated condition that still performs the desired function or achieves the desired result, such as a condition that is within an acceptable predetermined tolerance or accuracy. For example, the term "approximately" refers to a condition that is within 10% of the stated condition. However, the term "approximately" does not exclude a condition that is exactly the stated condition.

In FIG. 1, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements described and illustrated in FIGS. 1-11, 14, 15, 18, 19, 22, 23, 26, and 27, referred to above, need be included in every example and not all elements described herein are necessarily depicted in each illustrative example. Unless otherwise explicitly stated, the schematic illustrations of the examples depicted in FIGS. 1-11, 14, 15, 18, 19, 22, 23, 26, and 27, referred to above, are not meant to imply structural limitations with respect to the illustrative example. Rather, although one illustrative structure is indicated, it is to be understood that the structure may be modified when appropriate.

In FIGS. 12, 13, 16, 17, 20, 21, 24, 25, and 28, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 12, 13, 16, 17, 20, 21, 24, 25, and 28 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the scanning apparatus 100 and the method 1000 have been shown and described, modifications may occur to those skilled in the art upon reading the specification. The present application includes such modifications and is limited only by the scope of the claims.

What is claimed is:

1. A scanning apparatus for scanning a part for predictive shimming, comprising:
   a scanning platform comprising:
   a base that is elongate along a first axis;
   a support beam that is coupled to the base and that is elongate along a second axis that is perpendicular to the first axis;
   a first arm that is coupled to a first side of the support beam; and
   a second arm that is coupled to a second side the support beam, opposite the first side of the support beam;
   a first scanner that is coupled to the first arm; and
   a second scanner that is coupled to the second arm, wherein:
   the base is movable to position the support beam relative to the part to be scanned;
   with the base positioned relative to the part, the support beam is movable along the first axis relative to the base to concurrently locate the first scanner at a first location along the first axis relative to the part and the second scanner at a second location along the first axis relative to the part;
   the first location along the first axis of the first scanner and the second location along the first axis of the second scanner are different;
   with the first scanner at the first location along the first axis, the first arm is independently movable along the second axis relative to the support beam to move the first scanner along the second axis relative to the part while generating first scan-data, representative of a first portion of the part, used for the predictive shimming; and
   with the second scanner at the second location along the first axis, the second arm is independently movable along the second axis relative to the support beam and relative to the first arm to move the second scanner along the second axis relative to the part while generating second scan-data, representative of a second portion of the part, used for the predictive shimming.

2. The scanning apparatus of claim 1, wherein:
   the scanning platform further comprises
   a carriage that is coupled to the base;
   the support beam is coupled to the carriage; and
   with the first scanner at the first location along the first axis and the second scanner at the second location along the first axis, the support beam is movable along a third axis, which is perpendicular to the first axis and the second axis, relative to the carriage to concurrently locate the first scanner at a first location along the third axis relative to the part and the second scanner at a second location along the third axis relative to the part.

3. The scanning apparatus of claim 2, wherein:
   with the first scanner at the first location along the first axis, the first arm is independently movable along the third axis relative to the support beam to move of the first scanner along the third axis relative to the part while the first arm moves along the second axis; and
   with the second scanner at the second location along the first axis, the second arm is independently movable along the third axis relative to the support beam and relative to the first arm to move of the second scanner along the third axis relative to the part while the second arm moves along the second axis.

4. The scanning apparatus of claim 1, wherein:
   the first scanner has a first field of view;
   the second scanner has a second field of view; and
   the first field of view and the second field of view at least partially overlap when the first arm and the second arm move along the second axis.

5. The scanning apparatus of claim 4, wherein:
   the first arm extends from the support beam in a first direction along the second axis;
   the second arm extends from the support beam in a second direction along the second axis that is opposite the first direction; and
   the first arm and the second arm move in opposing directions along the second axis relative to each other.

6. The scanning apparatus of claim 1, wherein:
   the scanning platform further comprises a plurality of wheel assemblies, coupled to the base; and
   the plurality of wheel assemblies enable movement of the scanning platform underneath the part to position the first scanner and the second scanner relative to a surface of the part.

7. The scanning apparatus of claim 6, wherein:
   the scanning platform further comprises a plurality of jacks, coupled to the base; and
   each one of the plurality of jacks selectively applies a constant force to the base so that the base maintains a repeatable shape after the scanning platform moves relative to the part.

8. The scanning apparatus of claim 1, wherein each one of the first scanner and the second scanner comprises a pair of laser scanners.

9. The scanning apparatus of claim 1, wherein:
   the first portion of the part, represented by the first scan-data, and the second portion of the part, represented by the second scan-data, at least partially overlap; and
   a first subset of the first scan-data and a second subset of the second scan-data represent an overlap of the first portion of the part and the second portion of the part.

10. The scanning apparatus of claim 9, further comprising:
- a computer that is in communication with the first scanner and the second scanner receives the first scan-data and the second scan-data,
- wherein the computer comprises a processor, configured to register the second scan-data to the first scan-data by aligning the second subset of the second scan-data with the first subset of the first scan-data.

11. The scanning apparatus of claim 10, further comprising:
- a first camera that is coupled to the first arm and that moves with the first scanner; and
- a second camera that is coupled to the second arm and that moves with the second scanner,
- wherein:
  - the first camera generates first images of the first portion of the part while moving along the second axis;
  - the second camera generates second images of the second portion of the part while moving along the second axis; and
  - the processor is further configured to:
    - correlate the first images to the first scan-data;
    - correlate the second images to the second scan-data;
    - detect an inconsistency on the part represented in at least one of the first images and the second images; and
    - extract a portion of data from at least one of the first scan-data and the second scan-data that represents the inconsistency.

12. A method of scanning a part for predictive shimming, the method comprising:
- utilizing a scanning apparatus, comprising:
  - a base that is elongate along a first axis;
  - a support beam that is coupled to the base and that is elongate along a second axis that is perpendicular to the first axis;
  - a first arm that is coupled to a first side of the support beam;
  - a second arm that is coupled to a second side the support beam, opposite the first side of the support beam;
  - a first scanner that is coupled to the first arm; and
  - a second scanner that is coupled to the second arm;
- moving the base to position the support beam relative to the part;
- moving the support beam along the first axis relative to the base to concurrently locate the first scanner at a first location along the first axis relative to the part and the second scanner at a second location along the first axis relative to the part, wherein the first location along the first axis of the first scanner and the second location along the first axis of the second scanner are different;
- with the first scanner at the first location along the first axis, independently moving the first arm along the second axis relative to the support beam to move the first scanner along the second axis relative to the part;
- with the second scanner at the second location along the first axis, independently moving the second arm along the second axis relative to the support beam and relative to the first arm to move the second scanner along the second axis relative to the part;
- scanning a first portion of the part to generate first scan-data, representative of the first portion of the part, used for the predictive shimming while moving the first scanner along the second axis relative to the part; and
- scanning a second portion of the part to generate second scan-data, representative of the second portion of the part, used for the predictive shimming while moving the second scanner along the second axis relative to the part,
- wherein:
  - the first portion of the part, scanned by the first scanner, and the second portion of the part, scanned by the second scanner, partially overlap each other; and
  - a first subset of the first scan-data and a second subset of the second scan-data represent an overlap of the first portion and the second portion.

13. The method of claim 12, further comprising:
- applying a constant force to the base using each one of a plurality of jacks, coupled to the base, so that the base has a repeatable shape;
- moving the base to reposition the support beam relative to the part; and
- re-applying the constant force to the base using each one of the plurality of jacks to duplicate the repeatable shape of the base.

14. The method of claim 12, wherein:
- the part comprises a frame of a wing of an aircraft; and
- moving the base comprises moving the base underneath the frame.

15. The method of claim 12, further comprising:
- registering the second scan-data to the first scan-data by aligning the second subset of the second scan-data with the first subset of the first scan-data; and
- forming part scan-data, representative of the first portion and the second portion of the part.

16. The method of claim 12, further comprising:
- moving the support beam along the first axis relative to the base to concurrently relocate the first scanner at a third location along the first axis relative to the part and the second scanner at a fourth location along the first axis relative to the part, wherein the third location along the first axis of the first scanner and the fourth location along the first axis of the second scanner are different;
- with the first scanner at the third location along the first axis, independently moving the first arm along the second axis relative to the support beam to move the first scanner along the second axis relative to the part;
- with the second scanner at the fourth location along the first axis, independently moving the second arm along the second axis relative to the support beam and relative to the first arm to move the second scanner along the second axis relative to the part;
- scanning a third portion of the part to generate third scan-data, representative of the third portion of the part, used for the predictive shimming while moving the first scanner along the second axis relative to the part; and
- scanning a fourth portion of the part to generate fourth scan-data, representative of the fourth portion of the part, used for the predictive shimming while moving the second scanner along the second axis relative to the part,
- wherein:
  - the first portion of the part and the second portion of the part form a first section of the part;
  - the third portion of the part and the fourth portion of the part form a second section of the part that is directly adjacent to the first section of the part;
  - the second portion of the part, scanned by the second scanner, and the third portion of the part, scanned by the first scanner, partially overlap each other;

a third subset of the second scan-data and a fourth subset of the third scan-data represent a second overlap of the second portion and the third portion;

the third portion of the part, scanned by the first scanner, and the fourth portion of the part, scanned by the second scanner, partially overlap each other; and a fifth subset of the third scan-data and a sixth subset of the fourth scan-data represent a third overlap of the third portion and the fourth portion.

17. The method of claim 16, further comprising:

registering the second scan-data to the first scan-data by aligning the second subset of the second scan-data with the first subset of the first scan-data;

registering the third scan-data to the second scan-data by aligning the fourth subset of the third scan-data with the third subset of the second scan-data;

registering the fourth scan-data to the third scan-data by aligning the sixth subset of the fourth scan-data with the fifth subset of the third scan-data; and forming part scan-data, representative of the first portion, the second portion, the third portion, and the fourth portion of the part.

18. The method of claim 16, further comprising:

moving the base relative to the part or moving the support beam along the first axis relative to the base to concurrently relocate the first scanner at a fifth location along the first axis relative to the part and the second scanner at a sixth location along the first axis relative to the part, wherein the fifth location along the first axis of the first scanner and the sixth location along the first axis of the second scanner are different;

with the first scanner at the fifth location along the first axis, independently moving the first arm along the second axis relative to the support beam to move the first scanner along the second axis relative to the part;

with the second scanner at the sixth location along the first axis, independently moving the second arm along the second axis relative to the support beam and relative to the first arm to move the second scanner along the second axis relative to the part;

scanning a fifth portion of the part to generate fifth scan-data, representative of the fifth portion of the part, used for the predictive shimming while moving the first scanner along the second axis relative to the part; and scanning a sixth portion of the part to generate sixth scan-data, representative of the sixth portion of the part, used for the predictive shimming while moving the second scanner along the second axis relative to the part, wherein:

the fifth portion of the part and the sixth portion of the part form a third section of the part that is directly adjacent to the second section of the part;

the fourth portion of the part, scanned by the second scanner, and the fifth portion of the part, scanned by the first scanner, partially overlap each other;

a seventh subset of the fourth scan-data and an eighth subset of the fifth scan-data represent a fourth overlap of the fourth portion and the fifth portion;

the fifth portion of the part, scanned by the first scanner, and the sixth portion of the part, scanned by the second scanner, partially overlap each other; and a ninth subset of the fifth scan-data and a tenth subset of the sixth scan-data represent a fifth overlap of the fifth portion and the sixth portion.

19. The method of claim 18, further comprising:

registering the second scan-data to the first scan-data by aligning the second subset of the second scan-data with the first subset of the first scan-data;

registering the third scan-data to the second scan-data by aligning the fourth subset of the third scan-data with the third subset of the second scan-data;

registering the fourth scan-data to the third scan-data by aligning the sixth subset of the fourth scan-data with the fifth subset of the third scan-data;

registering the fifth scan-data to the fourth scan-data by aligning the eighth subset of the fifth scan-data with the seventh subset of the fourth scan-data;

registering the sixth scan-data to the fifth scan-data by aligning the tenth subset of the sixth scan-data with the ninth subset of the fifth scan-data; and forming part scan-data, representative of the first portion, the second portion, the third portion, the fourth portion, the fifth portion, and the sixth portion of the part.

20. A method of scanning a part, the method comprising:

moving a first scanner and a second scanner to a first scan location along an X-axis relative to the part so that the first scanner is at a first X-location and the second scanner is at a second X-location that is different than the first X-location;

with the first scanner at the first X-location, moving the first scanner along a Y-axis and scanning a first portion of the part to generate first scan-data, representative of the first portion of the part;

with the second scanner at the second X-location, moving the second scanner along the Y-axis and scanning a second portion of the part to generate second scan-data, representative of the second portion of the part;

moving the first scanner and the second scanner to a second scan location along the X-axis relative to the part so that the first scanner is at a third X-location and the second scanner is at a fourth X-location that is different than the third X-location;

with the first scanner at the third X-location, moving the first scanner along the Y-axis and scanning a third portion of the part to generate third scan-data, representative of the third portion of the part; and with the second scanner at the fourth X-location, moving the second scanner along the Y-axis and scanning a fourth portion of the part to generate fourth scan-data, representative of the fourth portion of the part, wherein:

the first portion of the part, scanned by the first scanner at the first X-location, and the second portion of the part, scanned by the second scanner at the second X-location, partially overlap;

a first subset of the first scan-data and a second subset of the second scan-data represent an overlap of the first portion and the second portion;

the second portion of the part, scanned by the second scanner at the second X-location, and the third portion of the part, scanned by the first scanner at the third X-location, partially overlap;

a third subset of the second scan-data and a fourth subset of the third scan-data represent a second overlap of the second portion and the third portion;

the third portion of the part, scanned by the first scanner at the third X-location, and the fourth portion of the part, scanned by the second scanner at the fourth X-location, partially overlap; and a fifth subset of the third scan-data and a sixth subset of the fourth scan-data represent a third overlap of the third portion and the fourth portion.

21. The method of claim 20, further comprising:
registering the second scan-data to the first scan-data by aligning the second subset of the second scan-data with the first subset of the first scan-data;
registering the third scan-data to the second scan-data by aligning the fourth subset of the third scan-data with the third subset of the second scan-data;
registering the fourth scan-data to the third scan-data by aligning the sixth subset of the fourth scan-data with the fifth subset of the third scan-data; and
forming part scan-data, representative of the first portion, the second portion, the third portion, and the fourth portion of the part.

* * * * *